United States Patent [19]

Hosaka et al.

[11] Patent Number: 5,436,448
[45] Date of Patent: Jul. 25, 1995

[54] SURFACE OBSERVING APPARATUS AND METHOD

[75] Inventors: Sumio Hosaka, Tokyo; Atsushi Kikugawa, Kokubunji; Yukio Honda, Fuchu; Hajime Koyanagi, Koshigaya; Shigeyuki Hosoki, Hachioji; Tsuyoshi Hasegawa, Tokyo, all of Japan

[73] Assignee: Hitachi, Ltd., Tokyo, Japan

[21] Appl. No.: 1,250

[22] Filed: Jan. 6, 1993

[30] Foreign Application Priority Data

| Jan. 10, 1992 | [JP] | Japan | 4-002863 |
| Jan. 13, 1992 | [JP] | Japan | 4-003676 |
| Apr. 23, 1992 | [JP] | Japan | 4-104276 |
| Apr. 27, 1992 | [JP] | Japan | 4-107329 |

[51] Int. Cl.⁶ .............................................. H01J 37/00
[52] U.S. Cl. ...................................... 250/306; 250/307; 324/260
[58] Field of Search ............ 250/306, 307; 369/1265; 365/101; 73/105; 324/260

[56] References Cited

U.S. PATENT DOCUMENTS

| 4,724,318 | 2/1988 | Binnig | 250/306 |
| 4,851,671 | 7/1989 | Dohl | 250/306 |
| 4,939,363 | 7/1990 | Bando et al. | 250/306 |
| 4,985,627 | 1/1991 | Gutierrez et al. | 250/306 |
| 5,017,010 | 5/1991 | Mamin et al. | 356/345 |
| 5,036,196 | 7/1991 | Hosaka et al. | 250/306 |
| 5,144,833 | 9/1992 | Amer et al. | 250/306 |
| 5,173,605 | 12/1992 | Hayes et al. | 250/306 |
| 5,187,367 | 2/1993 | Miyazaki et al. | 250/306 |
| 5,193,385 | 3/1993 | Nishioka et al. | 250/306 |

OTHER PUBLICATIONS

*Journal of Applied Physics,* "Atomic Force Microscope-Force Mapping and Profiling on a Sub 100-A Scale", Y. Martin, May 5, 1987.
*Nikkei Microdevices,* Nov. 1991.
*Journal of Vacuum Science,* "Application of Atomic Force Microscopy to Magnetic Materials", P. Grutter, et al., A6(2), Mar./Apr. 1988.
*Applied Physics Letters,* Y. Martin, et al., "Magnetic Imaging By 'Force Microscopy' with 1000 A Resolution", 50(20), May 18, 1987.
*Journal of Applied Physics,* "Electrical Conduction in Thin Chromium Films", E. S. A. Mehanna, et al., 61(8), Apr. 15, 1987.
*Journal of Applied Physics,* "Characteristics of BE+ and O+ or H+ Co-Implantation in GsAs/AIGaAs Heterojunction Bipolar Transistor Structures", S. J. Pearton, et al., Jan. 15, 1991.
*Journal of Vacuum Science,* "The Photon Scanning Tunneling Microscope", T. L. Ferrel, et al., B9(2) Mar.-/Apr. 1991.
*Journal of Research Development,* "Scanning Tunneling Microscopy", G. Binnig, et al., vol. 30, No. 4, Jul. 1986.
*Journal of Vacuum Science and Technology Part B,* "Vacuum Tunneling of Spin Polarized Electrons Detected bby Scanning Tunneling Microscopy", R. Wiesendanger, et al., vol. 9, No. 2, Mar. 1, 1991 New York.

(List continued on next page.)

*IBM Technical Disclosures Bulletin,* "Combined Scanning Tunneling and Capacitance Microscope", vol. 32, No. 88, Jan. 1990, New York.

Primary Examiner—Paul M. Dzierzynski
Assistant Examiner—Kiet T. Nguyen
Attorney, Agent, or Firm—Antonelli, Terry, Stout & Kraus

[57] ABSTRACT

A surface observing apparatus for obtaining information of a specimen comprises a probe disposed in the close vicinity of the specimen, a deformable cantilever for holding the probe, a scanning mechanism for scanning a surface of the specimen with the probe and a detector for detecting displacements of the cantilever to thereby allow information of the specimen to be derived on the basis of the displacement of the cantilever. The apparatus further comprises a first detector for detecting a force acting on the probe from the displacement of the cantilever, and a second detector for measuring a change in the force acting on the probe on the basis of the displacement of the cantilever.

24 Claims, 16 Drawing Sheets

OTHER PUBLICATIONS

*Applied Physics Letters*, "Simultaneous Measurement of Lateral and Normal Forces with an Optical–Beam–Deflection Atomic Force Microscope", G. Meyer, et al., vol. 57, No. 20, Nov. 12, 1990 New York.

*Journal of Applied Physics*, "Magnetic Force Microscopy General Principles and Application to Longitudinal Recording Media", D. Rugar, et al., vol. 68, No. 3, Aug. 1, 1990, New York.

*Applied Physics Letter*, "Improved Fiber–Optic Interferometer for Atomic Force Microscopy", D. Rugar, et al., vol. 55, No. 25, Dec. 18, 1989, New York.

*Journal of Applied Physics*, "Atomic Force Microscope-Mapping and Profiling on a Sub 100 Angstrom Scale", Y. Martin, et al., vol. 61, No. 10, May 15, 1987, New York.

*Journal of Applied Physics*, "Study of Magnetic Stray Field Measurement on Surface Using New Force Microscope", S. Hosaka, et al., vol. 31PT2, No. & A, Jul. 1, 1992, New York.

*Journal of Applied Physics*, "Simultaneous Observation of 30 Dimensional Magnetic Stray Fiedl and Surface Structure Using New Force Microscope", S. Hosaka, et al., vol. 31PT2, No. 7A, Jul. 1, 1992, New York.

*Journal of Vacuum Science and Technology*, "Force Microscope with Capacitive Displacement Detection", T. Goddenhenrich, et al., vol. 8, No. 1, Jan. 1, 1990, New York.

F I G. 4a
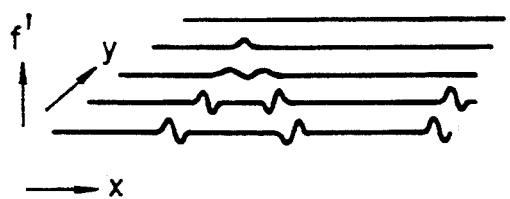
F I G. 4b
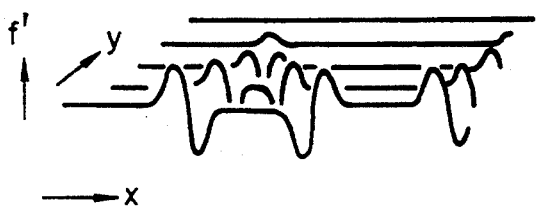
F I G. 4c
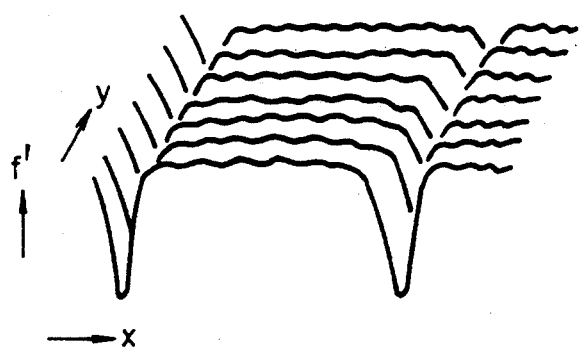

F I G. 15
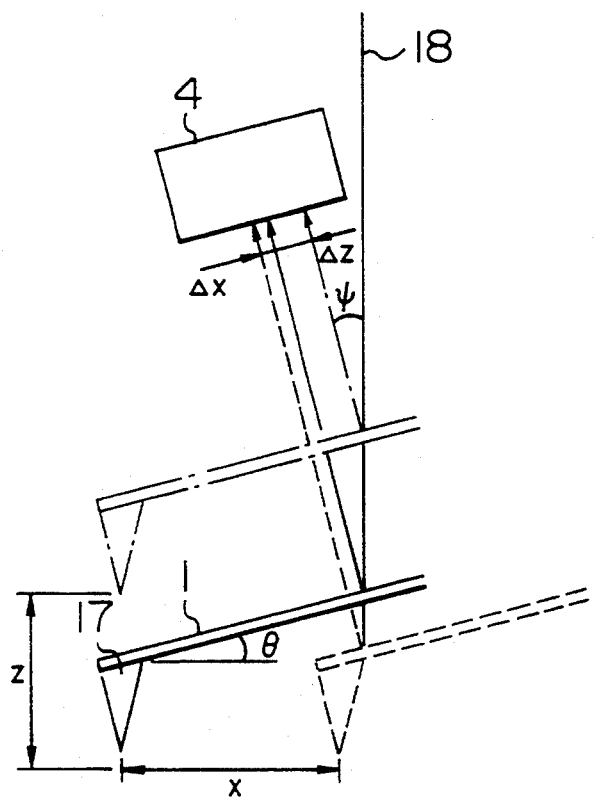
$\Delta x = 2x \sin \theta \sin \dfrac{\psi}{2}$
$\Delta z = z \sin \psi$ F I G. 24
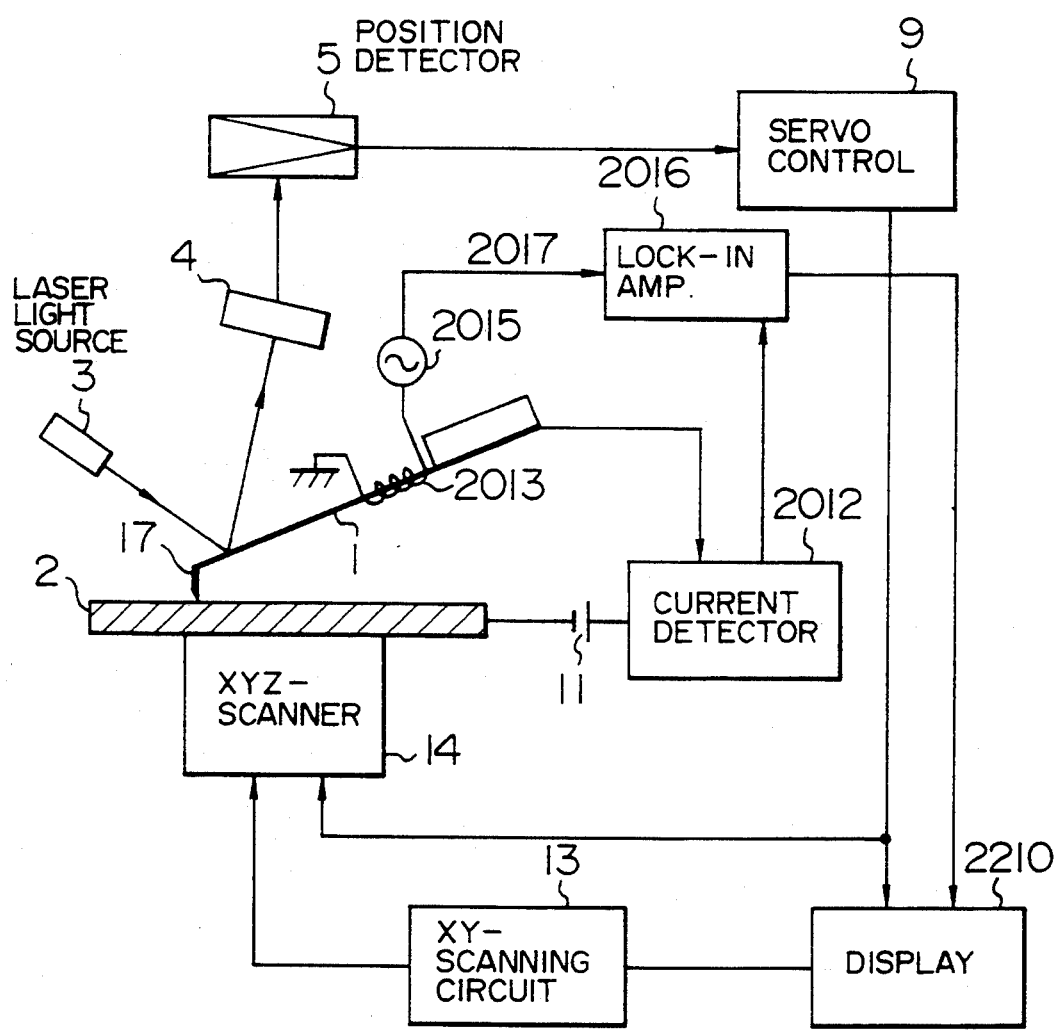

SURFACE OBSERVING APPARATUS AND METHOD

BACKGROUND OF THE INVENTION

The present invention relates generally to an apparatus for observing or examining surface geometries and physical properties of a specimen. More particularly, the invention is concerned with a method and an apparatus for obtaining information concerning surface geometries, physical properties, magnetic and electric or like properties of a specimen and/or information concerning thickness, properties or nature of insulation film or the like deposited on a specimen surface by making use of an atomic force, a magnetic force, a tunneling current or the like which becomes effective or takes place between a probe and a specimen surface when the probe is moved closely toward the specimen surface in a relative sense, such as by an atomic microscope, a magnetic force microscope or a like surface observing or examining apparatus.

In the state of the art which the present invention concerns, there is proposed and discussed an atomic force microscope for observing or examining a surface of a specimen by scanning it with a probe mounted on a cantilever at a free tip end thereof while maintaining a constant a force of an extremely or infinitesimally small magnitude (repulsive force or attraction) acting between the probe and the specimen surface by detecting displacement (or deflection) of the cantilever by means of an STM probe and maintaining constant displacement of the cantilever through a servo control. In this conjunction, reference may be made, for example, to U.S. Pat. No. 4,724,318 (which corresponds to JP-A-62-130302). Further, a method of detecting a force gradient acting on a probe while vibrating the latter is described in "Journal of Applied Physics", Vol. 61, pp. 4723–4729 (1987).

With the techniques known heretofore such as those mentioned above, a surface structure of a specimen can be observed by controlling a position of a probe such that a force acting on the probe is held to be constant. Furthermore, a magnetic stray field and/or an electric stray field prevailing above a specimen surface can be measured or determined on the basis of the force gradient as detected. However, it is impossible to know at what height or distance the magnetic stray field and/or electric stray field is present above the specimen surface or what correlation exists between a surface structure of the specimen and the magnetic stray field or the electric stray field. Further, in addition to the measurement of an extremely small force acting in the direction perpendicular to the specimen surface, it is equally desirable to be able to measure an infinitesimal force in the horizontal direction (i.e., intra-plane direction), from the viewpoint of determination of a frictional force and a magnetic force. However, measurement of the force in the horizontal direction was heretofore impossible.

SUMMARY OF THE INVENTION

In the light of state of the art mentioned above, it is an object of the present invention to provide a surface observing apparatus which can solve successfully the problems which the prior art surface observing apparatuses suffer.

In view of the above and other objects which will become apparent as description proceeds, there is provided according to a general aspect of the invention a surface observing or examining apparatus which comprises a means for vibrating at least a cantilever having a free tip end at which a probe is fixedly mounted, means for measuring or determining a DC component of displacement or deflection of the cantilever, and means for measuring or determining an AC component of the deflection of the cantilever, to thereby allow a surface structure of a specimen to be observed on the basis of the DC component of the deflection of the cantilever while allowing simultaneously a magnetic stray field and an electric stray field to be measured or determined on the basis of the AC component of the deflection of the cantilever.

According to another aspect of the invention, there is further provided a surface observing apparatus which comprises means for vibrating the cantilever in the horizontal direction by applying rotational or torsional force to the cantilever and means for detecting deflection of a light beam reflected on the cantilever, for thereby measuring a microscopic or infinitesimal force (i.e., a force of extremely small magnitude).

The principle underlying the surface observing apparatus according to the present invention will be elucidated below. By vibrating a cantilever having a probe mounted at a free tip end thereof and moving the probe closely toward a specimen for observation, the cantilever tends to be deformed under the influence of a repulsive force or attraction, as a result of which the probe is displaced correspondingly. The displacement of the probe is then measured by means of a position detector which is realized to operate on the basis of a laser beam deflection detecting method (also known as an optical lever method). Three-dimensional information of the surface structure of a specimen can then be derived from the changes in the position of the probe or specimen by measuring a DC component of deflection of the cantilever (i.e., deflection component of a very low frequency) and controlling the position of the specimen or the probe along the Z-axis (i.e., the axis extending orthogonally to the specimen surface) so that the force acting on the probe, i.e., the DC deflection component is held to be constant. At the same time, the force gradient can additionally be measured by deriving selectively from the output of the position detecting system an AC component of the deflection of the cantilever and extracting a same frequency component as the exciting or vibrating frequency of the cantilever. On the basis of the force gradient thus measured, the magnetic stray field and/or the electric stray field existing in the vicinity of the specimen surface can be determined. Additionally, when magnetic stray fields and/or electric stray fields existing above the specimen surface with distances therefrom are to be measured, motion of the probe or specimen in the X-, Y- and Z-directions is stopped at every pixel position for acquiring specimen surface information in the course of scanning of the specimen with the probe in the relative sense (i.e., the scanning may be performed by moving the probe relative to the specimen or alternatively moving the specimen relative to the probe), whereupon the probe is moved to a position or to a plurality of discrete positions located at a desired height or heights from the specimen surface, and the force gradient or gradients acting on the probe at these positions are detected.

In this manner, not only the surface structure of the specimen but also the three-dimensional magnetic stray field or electric stray field existing over and above the specimen surface can be measured.

In the measurement of the magnetic stray field distribution, there is employed a probe having a surface covered with a magnetic material or alternatively a probe formed of a magnetic material. On the other hand, for the measurement of the electric stray field distribution, the probe is required to have at least a surface portion which is formed of an electrically conductive material. Detection of the atomic force, the magnetic force and/or the electrostatic force can be realized by adopting a method for detecting in a contactless manner the deflection or displacement of an element or member having a large area such as those typified by a laser beam deflection method (which may also be referred to as an optical lever method), a laser interferometer method or a capacitance method, an astigmatic method or the like. The optical lever method and the laser interferometer method are shown in "Nikkei Microdevices", pp. 99–100 (Nov. 1991).

It is another object of the present invention to provide an apparatus which is capable of observing surface geometries of a specimen and at the same time a magnetic domain structure in a same plane with a high degree of accuracy.

Heretofore, a method of acquiring magnetic information of a specimen by resorting to the use of a scanning magnetic force microscope in which a magnetic force made effective by moving a magnetic probe and a specimen close to each other is utilized is known from "Journal of Vacuum Science Technology" A6, pp. 279–282 (1988) and "Applied Physics Letters", Vol. 50, pp. 1455–1457 (1987).

The operation modes of the atomic force microscopes and the magnetic force microscopes may globally be classified into two categories. In the operation mode of the first category, a specimen surface is scanned with a probe mounted at a free tip end of a cantilever in a region where an atomic force acts relative to the specimen surface (i.e., in a region distanced from the specimen surface by less than several ten nanometers), wherein a DC component of changes in the atomic force is detected for the measurement of surface geometries of the specimen and the direction of the magnetic forces. On the other hand, in the operation mode of the second category, the cantilever is vibrated at a frequency close to a resonance frequency thereof, and a change in the resonance frequency of the cantilever due to a force acting on the probe is detected for thereby measuring a force gradient. In this case, the probe is caused to vibrate with a minute amplitude in the direction perpendicular to the specimen surface in a region distanced therefrom by several ten to several hundred nanometers.

In the atomic force microscope disclosed in the U.S. Pat. No. 4,724,318 in which a specimen position is controlled in the Z-direction relative to the probe while scanning the specimen in the XY-directions, there is involved a time-consuming, troublesome procedure for cutting out a fragmentary portion from the specimen for the observation. In other words, when a specimen of a large area is to be observed intact by using the atomic force microscope disclosed in the above-mentioned publication, the region of the specimen to be scanned is inevitably very extensive because an area of the specimen surface to be observed extends over a wide range. However, with this prior art microscope, it is very difficult to scan the specimen over such a wide range in the X- and Y-direction with a high degree of accuracy and at a high rate of speed. Besides, in the prior art microscope in which the X Y-scanning and the Z-control are performed for the specimen, another problem arises in that the scanning speed as well as the control speed becomes necessarily lowered when a large area specimen is to be observed intact because such specimen is usually heavy in weight.

Accordingly, still another object of the present invention is to provide a surface observing apparatus which is capable of observing intact, or straightforwardly, even a specimen of a large size such as a semiconductor wafer, a magnetic disk or the like with no need for cutting the specimen into fragments for the observation.

To this end, in a mode for carrying out the invention, a structure is adopted in which a cantilever having a probe held at a free end thereof is caused to scan a specimen in the X- and Y-directions in the state in which the cantilever is undergoing a control in the Z-direction relative to the specimen.

In a preferred embodiment of the invention, a specimen stage for holding the specimen thereon may be provided with an XY-moving mechanism or an r-$\theta$ moving mechanism which can assure a wide range (greater than about 1 mm) of motion of the specimen stage.

By virtue of such structure in which the cantilever equipped with the probe is installed on a mechanism which is moved for the X- and Y-scanning operations and which is subjected to a servo control in the Z-direction, wherein the specimen surface is scanned with the probe in the X- and Y-directions while controlling through a servo control loop the position of the probe in the Z-direction relative to the specimen so that an infinitesimal or microscopic force acting between the probe and the specimen remains constant, there can be avoided the necessity for providing a high precision X- and Y-scanning mechanism and a Z-servo control mechanism in association with the specimen stage.

By disposing the specimen on a conventional specimen moving stage (XY-stage or r-$\theta$ stage) which can move in the X- and Y-directions over a wide range without requiring the X- and Y-scanning and the Z-servo control with high accuracy, the specimen can be moved over a wide range in the X- and Y-directions by moving the specimen moving stage or mechanism, whereby minute surface structure of a large size specimen can be observed or examined at desired surface positions in a much facilitated manner.

Additionally, by adopting a laser beam deflection method for detecting the angle of deflection of the cantilever brought about by a microscopic force atomic force and magnetic force) which acts between the tip end of the probe and the specimen surface, for thereby detecting the microscopic or infinitesimal force (i.e., an extremely small force), there can be realized a contactless microscopic force detection system which can enjoy a high sensitivity and a high accuracy notwithstanding of translational motion of the cantilever. More specifically, when the angle of deflection of the cantilever is to be detected by adopting the laser beam deflection method (or optical lever method, to say in another way), the position on a rear surface of the cantilever where the laser beam impinges undergoes changes in dependence on the translational motion of the cantilever which is brought about in accompanying the scanning operation in the X- and Y-directions and/or the control of the cantilever in the Z-direction. However, when compared with the magnitude of displacement of a laser light spot on a photodetector which is brought about by the change in the incidence position of the laser beam (i.e., the detection sensitivity to the change in the incidence position of the light beam), magnitude of displacement of the light beam on the photodetector brought about by changes in the angle of deflection of the cantilever under the influence of the microscopic force which is to be detected is as large as by a fourth order of magnitude. Thus, measurement error due to the change in the light beam incidence position caused by the XY-scanning and the Z-control of the cantilever as mentioned above can be duly neglected. It will now be understood that a microscopic or infinitesimally small force acting between the tip end of the probe and the specimen surface can be detected with a satisfactory accuracy notwithstanding an arrangement that the probe mounted at a free end of the cantilever is caused to move for effectuating the scanning in the X- and Y-directions and by the servo control in the Z-direction.

Thus, the XYZ-fine-moving mechanism imparted with a high-accuracy Z-servo control function which had to be provided in association with the specimen stage in the case of the apparatuses known heretofore can be rendered unnecessary by adopting the teachings of the present invention. This in turn means that such a structure can be realized in which a large size specimen is disposed on a conventional XY-stage which requires no Z-servo control, whereby the specimen can be observed in the original size with no need for cutting it into fragments, to another great advantage. The phrase "conventional XY-stage", it is intended to mean a hitherto known specimen moving stage equipped with a conventional XY-moving mechanism (or r-$\theta$ moving mechanism) which can move a specimen held directly thereon over a wide range (preferably greater than 1 mm in the forward and the rearward directions as well as to the left and the right, respectively).

As another preferred mode for carrying out the invention, an improvement is contemplated for the techniques disclosed in U.S. Pat. No. 4,724,318 and "Journal Of Applied Physics" Vol. 61, pp. 4273–4729 (1987) in the respect that the scanning of a specimen is effected with a cantilever which is equipped with a probe and which is vibrated with a minute amplitude in the direction perpendicular to the specimen surface without contacting the specimen, for thereby detecting change in the resonance frequency of the cantilever, which change is brought about by a force acting on the probe and hence the free tip end of the cantilever.

According to the above-mentioned method, change in the resonance frequency of the cantilever is detected which takes place due to change in the effective spring constant of the cantilever under the influence of an atomic force acting between the tip end of the cantilever and the specimen surface in the state where the cantilever is positioned in a contactless manner with a distance of several ten nanometers from the specimen surface. In other words, the cantilever is excited by a driving force at a frequency close to the resonance frequency of the cantilever, and the change in the resonance frequency is detected in terms of change in the amplitude by making use of resonance characteristic of the cantilever according to a so-called slope detection method, wherein the scanning is performed by controlling the distance between the specimen and the cantilever so that the amplitude as detected remains constant.

This method features detection of a differential coefficient in the Z-axis (i.e., in the direction orthogonal to the specimen surface) rather than the direct force detection. By virtue of this feature, the force acting on the tip end of the cantilever can be detected even when the force is of small magnitude, provided that the differential coefficient in the Z-direction is sufficiently large. In reality, the force detected in this mode is an extremely feeble attraction acting in the vicinity of a solid surface. Furthermore, this method is adopted most widely in the magnetic force microscopes since interaction with the probe is extremely feeble due to an extremely small volume of the magnetic tip end. A typical one of the magnetic force microscope in which the above-mentioned method is adopted is disclosed in "Applied Physics Letters", Vol. 50, pp. 1455–1457 (1987).

Heretofore, detection of shift of the resonance point of the cantilever relies mainly on the slope detection method. However, this method suffers drawbacks. First, it is susceptible to the influence of factors which are irrelevant to the resonance point shift of the cantilever such as variation in the power of a laser constituting a light source for a laser interferometer used for detecting the amplitude of the cantilever. As a second problem, it may be mentioned that the bandwidth of the operating frequency is narrow, which can be explained by the fact that a wide bandwidth of an amplitude detecting circuitry is unavailable for ensuring a sufficiently high signal/noise ratio because the amplitude of the cantilever is extremely small as in a range of several nanometers to several ten nanometers.

Regarding the measures for coping with the problems mentioned above, a method of detecting directly, or straightforwardly, the point of resonance of the cantilever has been proposed, as disclosed in "Journal Of Applied Physics", Vol. 69, pp. 698–703 (1991). A feature of this method is seen in that an oscillation circuit is implemented by positively feeding back an output of a cantilever vibration detecting circuitry, wherein oscillation signal of the oscillation circuit is detected by an FM detector to thereby directly detect the point of resonance of the cantilever by making use of the fact that the oscillation circuit of this type oscillates at a resonance point of a resonator included in the oscillation circuit. By adopting this technique, it is now possible to construct a scanning magnetic force microscope which is less susceptible to external disturbances and which can assure a wide bandwidth.

However, there still remain several problems to be solved. At first, it must be pointed out that the oscillator realized in the manner described above has poor frequency stability. In particular, when the oscillator device is operated under the atmospheric pressure, degradation in the frequency stabilization becomes remarkable because of a small Q-value of the cantilever as a resonator under the influence of the wind resistance or other factors. Since the output of this device is intrinsically a frequency signal, instability of the oscillation frequency leads to generation of noise, which is of course reflected to the output of the device. As a second problem, the oscillation circuit under consideration may stop oscillation under the influence of noise or other factors when it oscillates with a small amplitude, because the oscillation circuit has a relatively high noise level.

As will be appreciated from the above discussion, the oscillation circuit known heretofore is poor in the stability of the oscillation frequency because of such arrangement that the output of the cantilever amplitude detecting system is simply fed back as it is. Further, due to a relatively high noise level, oscillation of a low amplitude lacks in stability as well.

Accordingly, a further object of the present invention is to solve the problems elucidated above by providing an oscillation circuit of a high stability and a low noise level.

In view of the above object, there is proposed according to another aspect of the invention a combination of a reference or standard oscillator stabilized in respect to the frequency and phase, a unit for vibrating the cantilever by a cantilever deflection signal and a phase comparator for comparing phase of the cantilever deflection signal with that of the output signal of the reference oscillator. In a preferred embodiment of the invention to this end, an electrostatic bias may be applied between the tip end of the cantilever and a specimen. Further, the cantilever may preferably have a probe tip end formed of a ferromagnetic material.

When the cantilever is vibrated with a displacement or deflection signal, the cantilever is caused to oscillate at a resonance frequency inherent thereto. By adjusting the distance between the tip end of the cantilever and the specimen surface so that phase difference between the output signal of the reference oscillator and the deflection signal of the cantilever is minimized, the oscillation frequency of the oscillation circuit can be stabilized with the noise level thereof being lowered. In this conjunction, it is to be mentioned that application of an electrostatic bias between the tip end of the cantilever and the specimen surface is effective in facilitating adjustment of the distance between the tip end of the cantilever and the specimen surface. Further, the cantilever tip end formed of a ferromagnetic material makes it possible to measure the magnetic stray field of the specimen.

An arrangement for detecting a magnetic domain structure of the specimen surface by detecting a tunneling current flowing between a magnetic specimen and a magnetic probe is discussed in "Journal Of Vacuum Science Technology", B9, pp. 519–524 (1991). According to this prior art, it is proposed that a probe (e.g. of chromium oxide) which is spin-polarized in the direction perpendicularly to the specimen surface is employed, wherein such phenomenon is made use of that a tunneling current flowing between the probe and the specimen assumes different values in dependence on parallel and anti-parallel orientations of spins in the magnetic specimen surface.

However, the magnetic information acquisition system mentioned above suffers from several shortcomings. In the case of a system for detecting DC component of force in the magnetic force microscope, it is difficult to discriminatively identify the surface structure of the specimen because of a feeble magnetic force acting between the probe and the specimen. On the other hand, in the system for detecting the magnetic gradient force, detection of high sensitivity can be realized, although difficulty is encountered in increasing the resolution power because of the measurement which is performed in a region distanced from the specimen surface. Although the tunneling current detecting scheme is suited for observation of the magnetic domain structure of a specimen having a flat surface such as a noncrystalline specimen, detection of the magnetic information for the other magnetic specimens encounters difficulty in acquiring accurate information and assuring high sensitivity, because of mixing of the surface structure information and the magnetic information.

According to the techniques known heretofore, distribution of the magnetic stray field over the specimen surface can be measured by controlling the probe position such that the magnetic force or magnetic force gradient acting on the probe is maintained constant. However, because of compound observation of the magnetic information and the geometrical information, it is difficult to predict the inherent magnetic information. On the other hand, the scheme for detecting the tunneling current flowing between the spin-polarized probe and the specimen can certainly permit observation of the magnetic domain structure of the specimen surface by controlling the probe position such that the tunneling current can be maintained constant. However, a problem arises in this case that the geometrical structure such as roughness of the specimen surface, will be indiscernible from the information of the magnetic domain structure.

Accordingly, yet another object of the present invention is to provide a surface observing apparatus which is capable of observing specimen surface geometries simultaneously with and discriminatively from the observation of a magnetic domain structure on a same plane with a high accuracy by making use of a tunneling current phenomenon.

For achieving the above-mentioned object, it is proposed according to another aspect of the invention to provide a spin-polarized ferromagnetic probe at a free end of the cantilever in combination with a means of detecting DC component of displacement or deflection of the cantilever, a means of detecting a current flowing between the probe and a specimen, a means for changing intensity of magnetization of the ferromagnetic probe with a specific frequency, a means of detecting a current flowing between the specimen and the probe at the above-mentioned specific frequency, and a means of scanning the specimen along a surface thereof with the probe, wherein the magnetic information of the specimen is acquired on the basis of change in the value of the current flowing between the probe and the specimen simultaneously with information of the specimen structure detected on the basis of information of change in the DC component of deflection of the cantilever.

When the ferromagnetic probe mounted at the free end of the cantilever is lowered to a region close to the specimen surface where a repulsive atomic force is active, the cantilever undergoes deflection under the atomic force. Displacement of the cantilever due to the deflection is measured by the position detector which operates by utilizing a laser beam deflection method or optical lever principle. The surface structure of the specimen is determined by measuring the DC component of deflection of the cantilever and controlling the position of the specimen or probe in the Z-direction (i.e., in the direction perpendicular to the specimen surface) such that the force acting on the probe becomes constant or magnitude of the DC component of deflection of the cantilever becomes constant.

At the same time, the tunneling current flowing between the ferromagnetic probe and the specimen surface is measured. The tunneling current changes as a function of the spin polarization factor P of the ferromagnetic probe. More specifically, in the case where orientation of the spin polarization in the specimen is parallel with that of the ferromagnetic probe, a tunneling current given by $I = I_0 (1 + P)$ is detected while a tunneling current given by $I = I_0(1-P)$ will be detected when orientation of the spin polarization in the specimen is anti-parallel to that of the ferromagnetic probe.

By controlling the position of the specimen or the probe in the Z-direction (perpendicularly to the specimen surface) so that the DC component of deflection of the cantilever is maintained constant and simultaneously measuring the tunneling current, the geometrical information and the magnetic domain information in the specimen surface region can discriminatively be measured while the geometrical information can be correlated with the magnetic domain information. Upon approaching of the ferromagnetic probe to the specimen surface, change may occur in the magnetization of the probe under the influence of the magnetic stray field of the specimen surface. In that case, the tunneling current may undergo only little change, involving a low S/N ratio (signal/noise ratio). To evade such unfavorable phenomenon, it is preferred to provide an exciting coil partially around the ferromagnetic probe to thereby measure the current of a maximum frequency while energizing the probe at a specific frequency.

Although a mono-magnetic domain structure of a monocrystal is most desirable for the ferromagnetic probe, there may be used a thin film formed through a physical evaporation method such as a spattering process and a vacuum evaporation process. Further, orientation of spin polarization of the probe may be perpendicular to or in parallel with the specimen surface and can be selected arbitrarily in dependance on the specimen. The probe and the specimen surface have to be formed of an electrically conductive material.

BRIEF DESCRIPTION OF THE DRAWINGS

FIGS. 4a to 4c schematically illustrate a surface structure image (AFM image) and magnetic force gradient distributions as obtained through measurement of an magnetooptical recording medium;

FIG. 15 is a view for illustrating the principle of generation of detection error according to another embodiment of the invention;

FIG. 24 is a diagram showing a still further embodiment of the invention.

DESCRIPTION OF THE PREFERRED EMBODIMENTS

The present invention will now be described in detail in conjunction with preferred or exemplary embodiments thereof by reference to the accompanying drawings.

Embodiment 1

Figure 1:
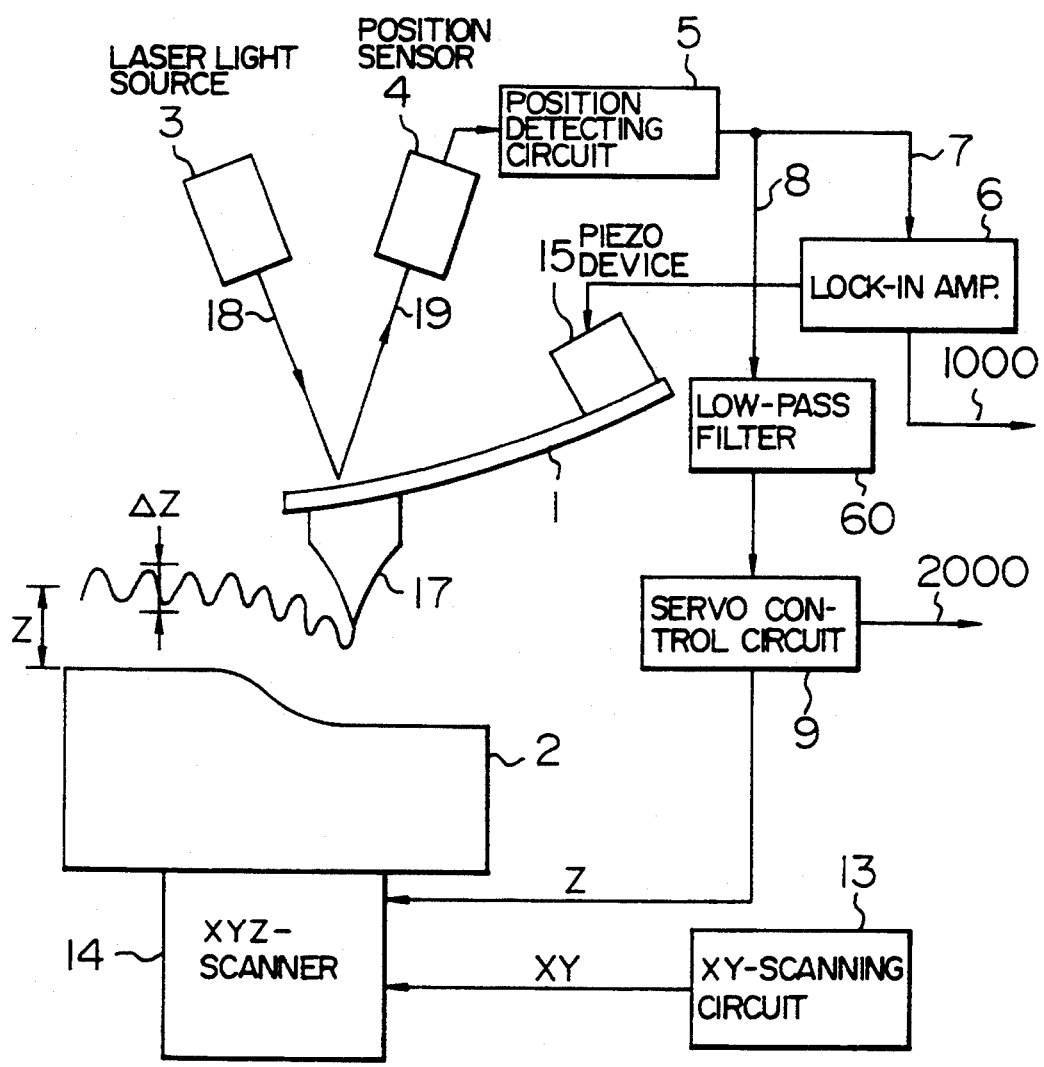
FIG. 1 is a block diagram schematically showing a general arrangement of a surface observing apparatus according to a first embodiment of the invention.

FIG. 1 is a view showing schematically a basic structure of a surface observing or examining apparatus according to a first embodiment of the invention. Referring to the figure, a reference numeral 1 denotes a cantilever 1 having a probe 17 mounted at a free end thereof is provided with a vibration exciting element exemplified by a piezoelectric device 15 at the other end. In response to the force which is exerted onto the probe 17 by a specimen 2, the cantilever deforms and vibrates. Deflection of the cantilever 1 thus brought about is detected by using laser beam deflection detecting method or an optical lever method.

To this end, there is provided a laser beam deflection detector which is comprised of a laser light source 3, a position sensor element 4 and a position detecting circuit 5. Of the signal components in an output signal from the position detecting circuit 5, only those which (that is DC components) fall within a range among a direct current is passed through a path line 8 and selected by a low-pass filter 60, as indicated in FIG. 1, and supplied to a servo-control circuit 9 which controls a Z-axis piezoelectric device constituting a part of an XYZ-scanner 14 to control the position of the specimen 2 in the Z-direction such that the cantilever's vibration or deflection component within a range among a direct current to a low frequency is maintained at a constant level. Owing to this arrangement, the probe 17 can scan the surface of a specimen 2 with an equi-distance therefrom. A surface structure (AMG image) of the specimen 2 can be obtained according to the control signals.

On the other hand, the signal components in the output signal from the position detecting circuit 5 an AC component passes through a path line 7 and is detected by a lock-in amplifier 6. The AC component has the same frequency as that of a vibration signal of a piezoelectric device by which the cantilever 1 is vibrated. Change in force gradients in the X- and Y-directions relative to the probe position is thus detected. By virtue of this arrangement, distribution(s) of magnetic stray fields, electric stray fields and/or potential can be obtained for display on a display device (not shown).

Now, operation of the surface observing apparatus will be elucidated in more detail. The cantilever 1 having the probe 17 mounted at a free end thereof is vibrated with a small amplitude by means of the piezoelectric device 15. In this state, when the probe 17 is moved toward the specimen 2, the cantilever 1 is deflected under a repulsive force or attraction. The deflection or displacement of the probe 17 is detected through the position detecting system operating in accordance with the afore-mentioned laser beam deflection detection method by making use of a reflected laser beam 19 resulting from reflection of an incident laser beam 18 on a rear surface of the cantilever 1. As the surface structure information of the specimen 2, three-dimensional information 2000 of the specimen surface can be obtained on the basis of changes in the position of the specimen 2 or probe 17 by controlling the position of the Z-axis of the specimen 2 (i.e., the axis perpendicular to the specimen 2) such that the force exerting on the probe 17 or the low-frequency deflection thereof is held constant by utilizing the DC or low-frequency component of deflection of the cantilever 1 (i.e., the deflection in the low frequency range not exceeding, for example, 5 kHz, inclusive of the DC component, as mentioned previously) through the servo control. (This operation is referred to as constant repulsive force mode operation.)

At the same time, the AC deflection of the cantilever 1 (i.e., deflection component of the same frequency as that of the vibration frequency applied by the piezoelectric device 15) is selectively detected from the output of the position detecting circuit 5, as described hereinbefore, whereby a force gradient signal 1000 can be obtained. On the basis of this force gradient signal 1000, the magnetic stray field as well as the electric stray field lying in the vicinity of the specimen surface can be detected.

As the method for detecting the force gradients, there can first be mentioned a method according to which the vibration frequency applied to the cantilever 1 is slightly deviated from the resonance frequency of the cantilever 1 and change in the vibration amplitude of the cantilever which makes appearance upon change in the force acting on the probe 17 is detected. As a second method to the same end, change in the resonance frequency of the cantilever 1 brought about by change in the force acting on the probe 17 is utilized for detecting the force gradients.

From the quantitative standpoint, the last mentioned method is preferred over the former because it is more straightforward. It should be mentioned that the response frequency of the servo circuit 9 is required to be lower than the vibration frequency applied to the cantilever 1. More specifically, because the response frequency of the servo system under consideration is limited to about 5 kHz or less in view of the response characteristics of the piezoelectric device 15 and the amplifier 6 or that of the servo system itself, the vibration frequency has to be higher than 10 kHz inclusive. Besides, the vibration frequency is subject to a limitation due to a mechanical resonance of the cantilever 1.

It should also be mentioned that measurement of the magnetic stray field distribution necessitates the use of the probe 17 having the surface covered with a layer of a magnetic material or the probe 17 made of a magnetic material. Similarly, for the measurement of the electric stray field distribution, at least the surface of the probe has to be formed of an electrically conductive material. Further, other methods than the laser beam deflection detecting method may equally be adopted for detecting atomic force, magnetic force or electrostatic force. As a typical method to this end, there may be mentioned a contactless large-area deflection detecting method such as a laser interferometer method, a capacitance method, an astigmatic method and the like.

In the following, description will be directed to, by way of example only, a composite detection of a surface structure and a three-dimensional magnetic field distribution or a three-dimensional electric field distribution according to the present invention. For the detection or measurement of the magnetic stray field distribution or electric stray field distribution prevailing above the specimen 2, it is required to determine the position information related to the specimen surface. To this end, the surface information is fetched by scanning the probe 17 in the X- and Y-directions in the constant repulsive force mode. In that case, the X- and Y-scanning operation is temporarily stopped at every pixel to change the distance between the surface of the specimen 2 and the tip of the probe 17 by moving the probe 17 or the specimen 2 in the Z-direction and the gradient of the force acting on the probe 17 at that time is measured. By repeating this procedure on a pixel-by-pixel basis, both the surface structure of the specimen 2 and the three-dimensional distribution of the magnetic stray fields or electric stray field can concurrently be measured.

Figure 2:
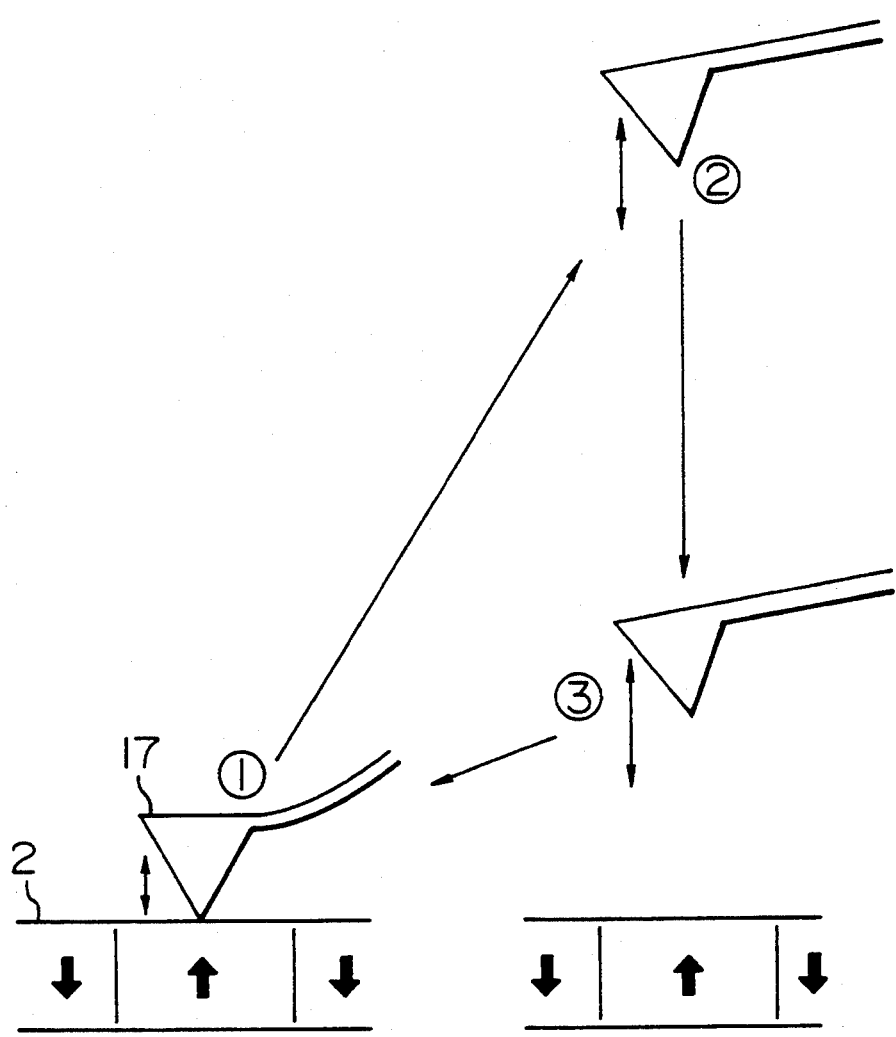
FIG. 2 is a diagram for conceptually illustrating operation of a probe mounted at a free end of a cantilever in the apparatus shown in FIG. 1.

FIG. 2 is a diagram for illustrating the movement of the probe 17 at each pixel. Referring to the figure, at a position indicated by an encircled numeral "1", the probe 17 is in the state to detect the surface structure of the specimen 2 in the constant repulsive force mode. At a position indicated by an encircled numeral "2", the probe 17 is inhibited from the movement in the X- and Y-directions, whereon the probe 17 or the specimen 2 is incrementally displaced in the Z-direction to thereby increase the distance between the specimen 2 and the probe 17, and the gradient of the force acting therebetween is detected or measured. Then the distance between the specimen 2 and the probe 17 is progressively decreased to measure the gradient of force acting therebetween at a position indicated by an encircled numeral "3". Although the measurement of the force gradients at two discrete positions "2" and "3" is assumed in the case of the illustrated example, it goes without saying that measurements at a greater number of the positions are desirable for obtaining data of higher accuracy. Further, the measurement of the force gradients can be performed by progressively moving the probe 17 toward the specimen 2 as in the case of the illustrated example or alternatively moving incrementally the probe away from the specimen without departing from the spirit and scope of the present invention. It should further be added that although the probe 17 is obliquely moved upwardly in the case of the illustrated example (FIG. 2), the probe 17 may be moved upwardly in the direction perpendicularly to the specimen surface. The probe 17 is depicted as it was obliquely moved upwardly in FIG. 2. The probe 17, in actuality, should be moved perpendicularly since it moves to detect the change in force gradients above the respective pixels as set forth above.

Figure 3:
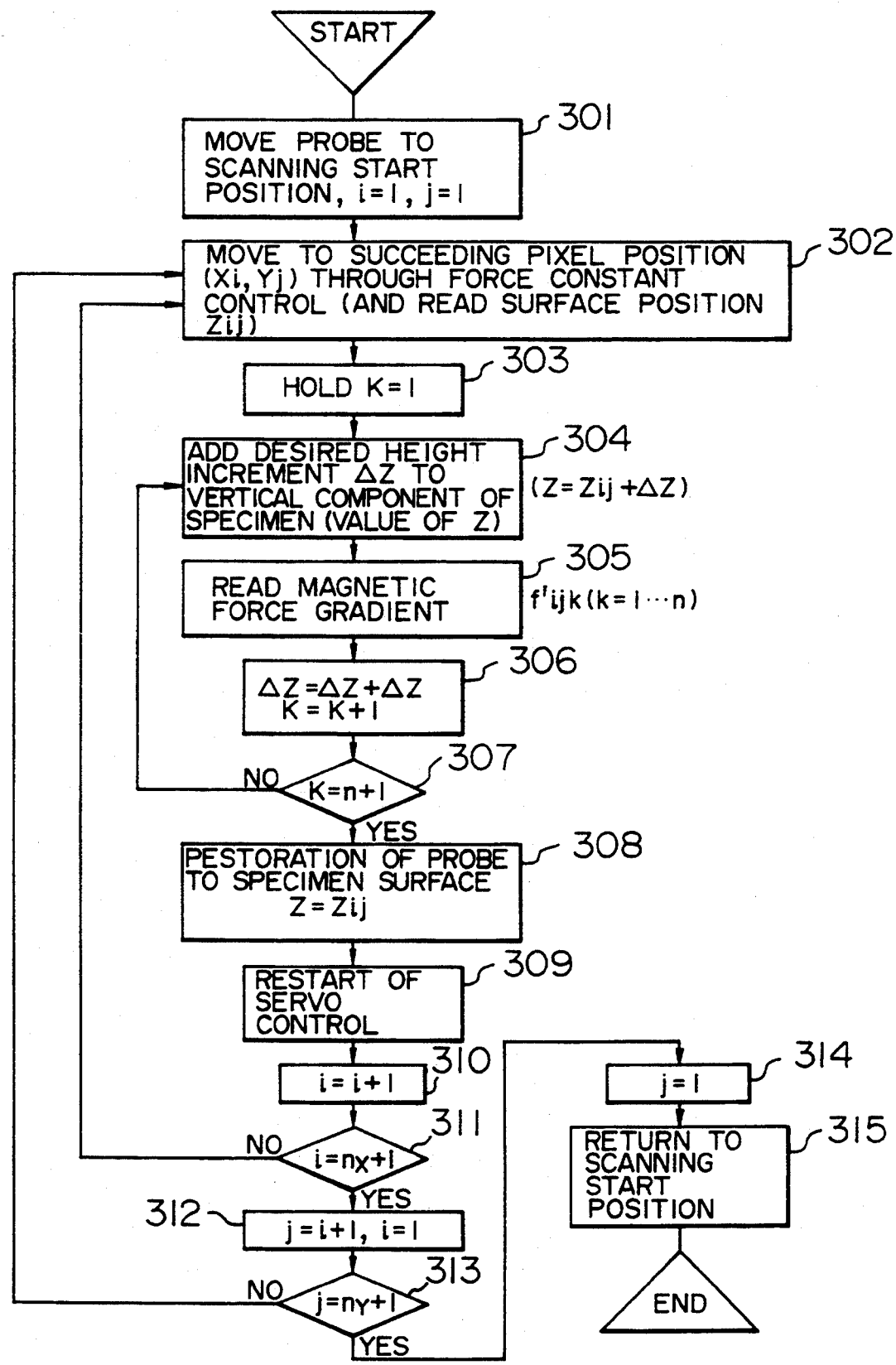
FIG. 3 is a flow chart for illustrating a procedure for measuring a three-dimensional magnetic stray field distribution.

FIG. 3 is a flow chart illustrating a procedure for measurement of a three-dimensional magnetic stray field distribution according to the above-mentioned method of the invention.

Referring to FIG. 3, the probe 17 is first moved to a scan starting position through the constant force servo-control (step 301). Subsequently, the probe 17 is moved to the position of a first pixel at which the measurement is to be performed (where the pixel positions are indicated by $X_i$ and $Y_j$), and the surface geometry information ($X_1$, $Y_1$, $Z_{11}$) is fetched (a step 302). Then, by temporarily holding the servo control, the probe 17 is moved to a position above the specimen 2 (step 303). In this case, by applying a voltage corresponding to the quantity $Z_{11}$ incremented by $\Delta Z$ of a first value is applied to the Z-axis piezoelectric device to thereby move the probe 17 correspondingly (step 304), which is then followed by measurement of the gradient of magnetic force (step 305). In succession, by placing a second value to the quantity $\Delta Z$, the magnetic force gradient at another position is measured (steps 306 and 307). Upon completion of measurement of the magnetic force gradients at desired positions, a voltage corresponding to the starting quantity $Z_{11}$ is applied to the Z-piezoelectric device (step 308). Then, the constant force servo control is restored to allow the probe 17 to resume the original position on the surface of the specimen 2 (step 309), and after a short stand-by state, the probe 17 is moved to a next pixel (steps 310, 311 and 302). The measuring procedure mentioned above is repeatedly executed. After acquisition of data for one line along the X-axis, the probe 17 is moved along the Y-axis by one step (increment), whereon the data is collected in the X-direction (steps 312 and 313). The measurement procedure described above is performed at all the pixel positions in the Y-direction for making available the desired data at all the pixels (steps 314 and 315).

FIGS. 4a to 4c schematically illustrate a surface structure image (AFM image) and a magnetic force gradient distribution obtained through the measurement procedure described above by reference to FIG. 2 in the case where a surface of an magnetooptical disk is observed. Through this measurement, information of the magnetic stray field distribution can be acquired simultaneously with the information of the surface structure of the specimen. More specifically, FIG. 4a shows a magnetic force gradient distribution acquired at the position "2" in FIG. 2, FIG. 4b shows a magnetic force gradient distribution acquired at the position "3" in FIG. 2, and FIG. 4c shows a surface structure of the specimen or magnetooptical disk observed at the position "1" in FIG. 2.

Figure 5:
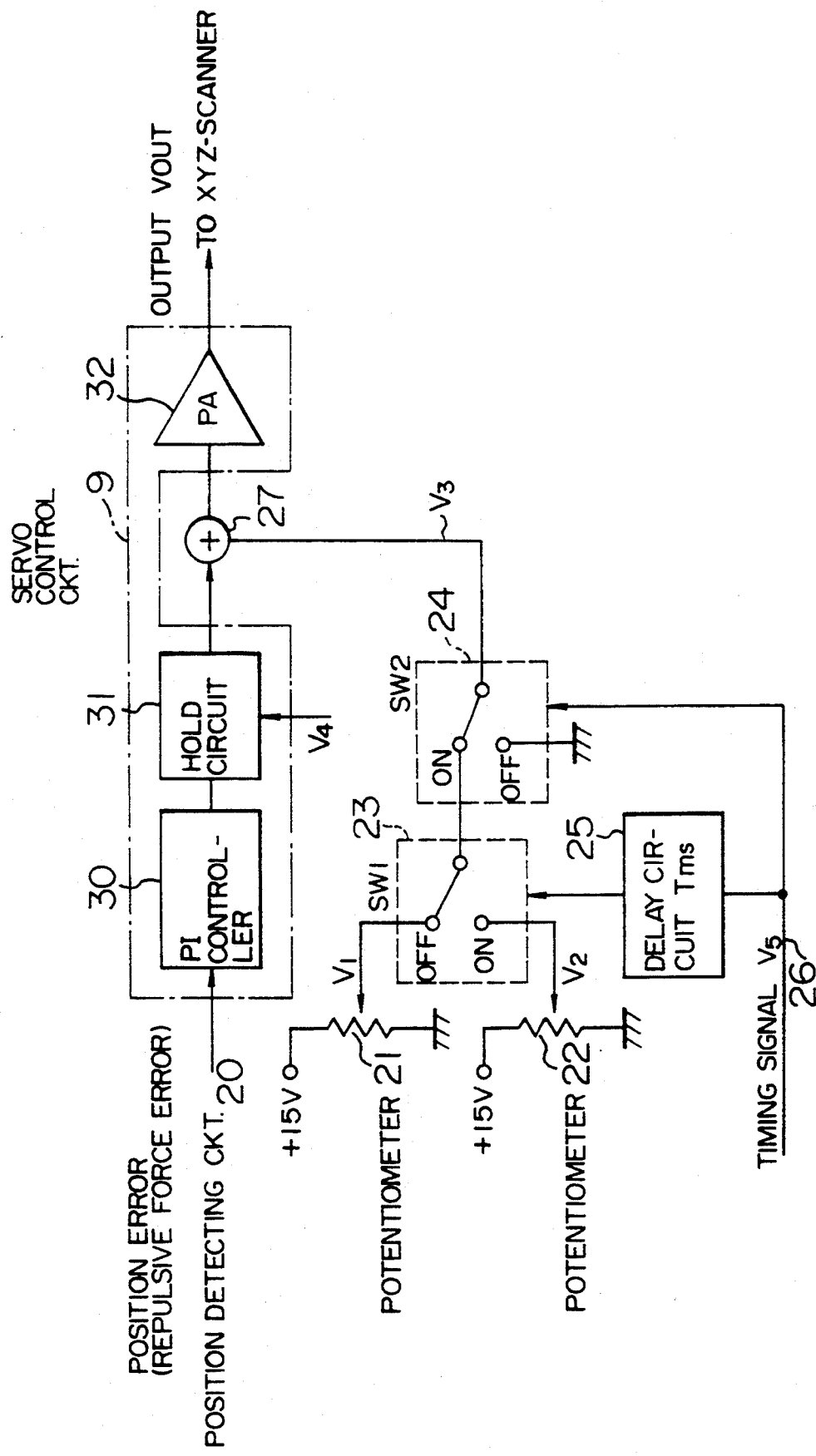
FIG. 5 is a block diagram showing an exemplary configuration of a servo control according to an embodiment of the invention.

FIG. 5 shows an exemplary configuration of the servo control circuit 9 which can be employed in carrying out the operation described above by reference to FIG. 2. The servo control circuit 9 responds to a position error signal 20 derived from the output of the position detecting circuit 5 to thereby control the position of the probe 17 or that of the specimen 2 so that the position error signal 20 becomes zero through operation of a PI or PID control circuit 30 for generating a voltage on the basis of integration (or plus differentiation) of the error signal in cooperation with a hold circuit 31 and a power amplifier 32. In the illustrated example, an adder circuit 27 is interposed between the hold circuit 31 and the power amplifier 32 to allow voltages $V_1$ and $V_2$ to be sequentially applied between the specimen 2 and the probe 17 in the XYZ-hold state (i.e., the state in which the probe 17 is temporarily held stationary relative to the specimen surface in the X-, Y- and Z-directions), to thereby set the distance between the specimen 2 and the probe 17 at desired values.

Figure 6:
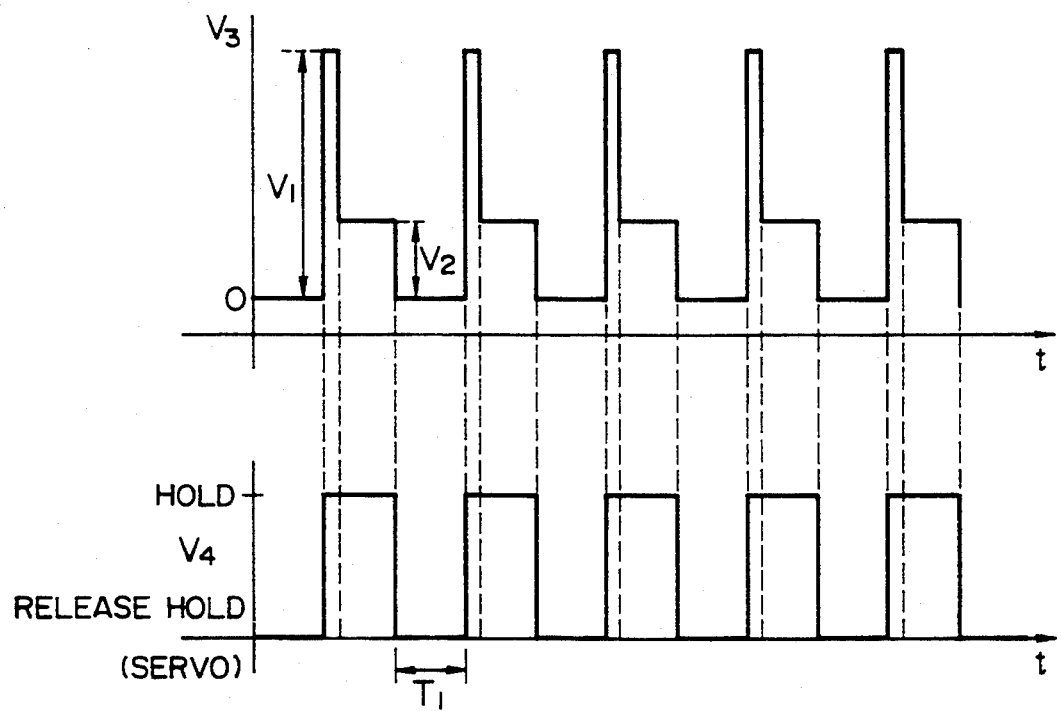
FIG. 6 is a timing chart for illustrating operations of the servo control circuit shown in FIG. 5.

FIG. 6 is a timing chart of a signal $V_3$ applied to the adder circuit 27 shown in FIG. 5. The hold circuit 31 is generally constituted by a sample and hold circuit or a combination circuit of an ADC (analogue-to-digital converter) and a DAC (digital-to-analogue converter). A servo/hold control signal $V_4$ is applied to the hold circuit so that the measurement of the surface structure performed in the servo control mode and the measurement of the magnetic stray field distribution performed in the hold mode can be distinguished from each other by the signal $V_4$. More specifically, in the servo mode, control is so performed for the probe 17 or specimen 2 that the probe 17 moves from one to another pixel in scanning the specimen surface in the X- and Y-directions with a constant repulsive force acting between the probe 17 and the specimen 2 to thereby acquire the surface structure information. On the other hand, in the hold mode, the voltage $V_3$ which is input to the adder circuit 27 and assumes a value of zero in the hold mode is changed stepwise to $V_1$ and $V_2$, to thereby move, stepwise or incrementally, the probe 17 toward the specimen from the above. At that time, the probe 17 moves from the position indicated by the encircled numeral "2" to the position indicated by "2" and then to the position indicated by "3". To this end, the voltages $V_1$ and $V_2$ are set by potentiometer 21 and 22, respectively, wherein the voltage $V_3$ of the waveform illustrated in FIG. 6 is applied to the adder circuit 27 through switch circuits 22 and 24 and a delay circuit 25. It will be noted that, in synchronism with generation of the hold signal $V_4$, the switch circuits 22 and 24 are triggered by a timing signal $V_5$ indicated by 26 in FIG. 5. Parenthetically, the probe 17 is moved to a succeeding pixel for the measurement during a time interval $T_1$ shown in FIG. 6 under the servo control. Although the probe control described above is realized by utilizing an analogue circuit technique, it will readily be understood that the similar sequence can be performed under the control of a correspondingly programmed computer.

Further, by interposing a spectrochemical analysis based on a tunneling current detection method known heretofore (refer to, for example, STS: IBM Journal of Research and Developments Vol. 30, pp. 355–369 (1986)) between the positions indicated by the encircled numerals "1" and "2" in FIG. 2, element analysis of a minute area of the specimen surface can be performed, thus making it possible to realize a complex or compound measurement with a higher accuracy. In that case, it is required that the probe 17 is formed of a magnetic material and covered with an electrically conductive material layer. Additionally, by operating the surface observing apparatus according to the instant embodiment under vacuum, the apparatus can be protected from adverse influence of moisture and at the same time the resonance characteristic thereof can further be improved, whereby measurements of higher accuracy can be ensured. Besides, it should be mentioned that the invention is not restricted to the illustrated cantilever structure but can be carried out by using any deflection detecting type cantilever structure which is capable of detecting the movements of the probe without resorting to the use of the laser beam deflection detecting method. In a preferred embodiment of the present invention, a cantilever provided with a piezoelectric device, a strain gauze device, a semiconductor strain resistor device or the like formed on the surface through a semiconductor process may be used for realizing further enhanced performance of the apparatus.

Embodiment 2

Figure 7:
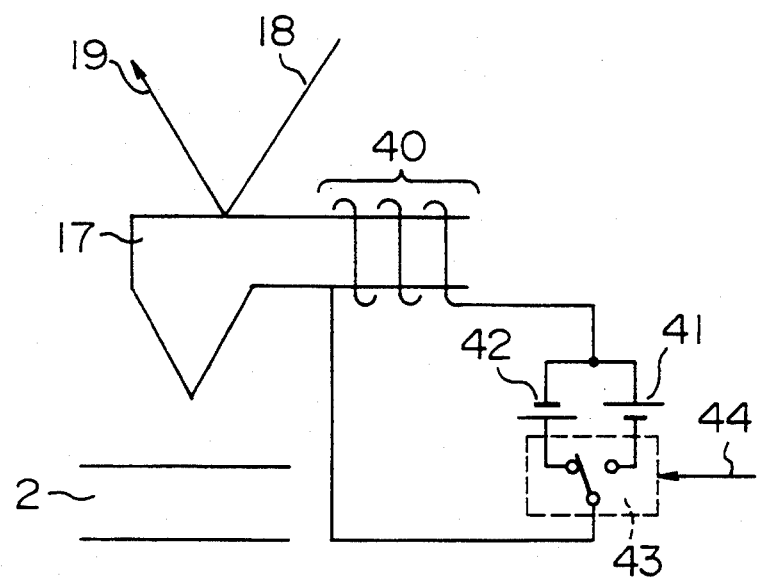
FIG. 7 is a view showing a structure for changing direction of magnetization of a probe.

FIG. 7 shows a main portion of the surface observing apparatus according to another embodiment of the invention. The apparatus of this embodiment is designed to measure the magnetic field distribution with a higher accuracy. Referring to FIG. 7, a magnetic probe 17 is wound with a coil 40, wherein a current is caused to flow through the coil 40 in two opposite directions alternately so that the magnetic poles of S- and N-polarities make appearance alternately at a tip of the probe 17, to thereby measure the magnetic forces with these alternating magnetic polarities. The magnetic force data obtained with one polarity and those obtained with the other polarity are subtracted from each other to thereby eliminate the spurious microscopic forces other than the magnetic force. In this way, intrinsic magnetic force or magnetic force gradient distribution can be measured. In FIG. 7, current sources or voltage sources 41 and 42 of opposite polarities are connected in parallel, wherein the current supplied to the coil 40 is changed over from the source 41 to 42 or vice versa by means of a change-over switch 43. Measurement for acquiring data of the magnetic force and/or the magnetic force gradient can be performed on a pixel-by-pixel basis, as described previously. As a procedure for acquisition of data through the measurement of the magnetic field distribution above the specimen surface as described hereinbefore by reference to FIG. 1, the position of the probe 17 is held at each pixel and the magnetic polarity appearing at the tip of the probe 17 is changed over in response to an external control signal 44 (preferably under the control of a computer). Upon completion of the scanning with the probe 17 over the whole specimen surface area of concern, there are available data of the surface geometry together with data of the magnetic force and/or data of magnetic force gradient distribution.

Embodiment 3

Figure 8:
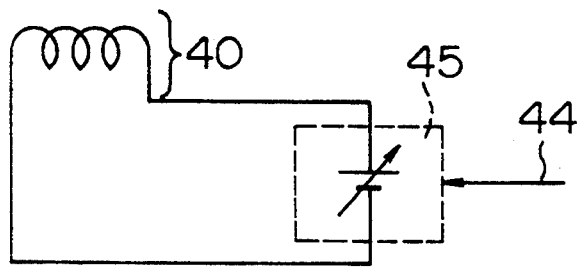
FIG. 8 is a diagram showing a structure of a mechanism for changing the magnetization of a probe.

FIG. 8 is a diagram showing still another embodiment of the invention. In the case of the instant embodiment, it is contemplated to obtain the magnetism data or information by varying the intensity of the magnetic field produced by a probe (not shown in FIG. 8) by varying correspondingly a current flowing through a coil 40 wound on the probe. To this end, a variable current source 45 connected to the coil 40 is controlled by an external control signal 44 so as to vary the magnetic field intensity of the probe, and the magnetic field distributions are measured with different values of the magnetic field intensity. According to the instant embodiment, the magnetic field distribution and others can be measured with different magnetic field intensities at desired positions. The method for the measurement may be carried out in the same manner as described hereinbefore by reference to FIG. 6. It should however be noted that the distance between the probe position and the specimen is not changed but the magnetic field intensity is changed in carrying out the measurement according to the instant embodiment.

Embodiment 4

Figure 9:
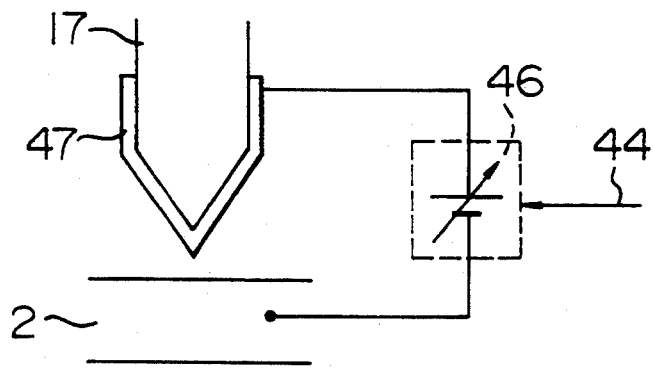
FIG. 9 is a diagram showing a structure for changing an electric charge of a probe.

FIG. 9 shows a structure of the probe which can be employed in the apparatus according to yet another embodiment of the invention. Referring to the figure, the probe 17 is coated with an electrically conductive material as shown at 47 for the purpose of carrying out a method of measuring an electric stray field distribution or an electric field gradient distribution. To this end, a voltage of desired magnitude is applied to the surface of the probe relative to the specimen, to thereby produce an electric field therebetween, as in the case of the embodiment shown in FIG. 8. With the structure of the probe 17 according to the instant embodiment, image data of the electric field distribution and the electric force gradient distribution can be measured on the specimen surface or at desired positions on or above the specimen. In this conjunction, it should however be noted that the voltage applied across the probe and the specimen is changed in the case of the instant embodiment instead of changing the magnetic field intensity as described by reference to FIG. 8.

Embodiment 5

Figure 10:
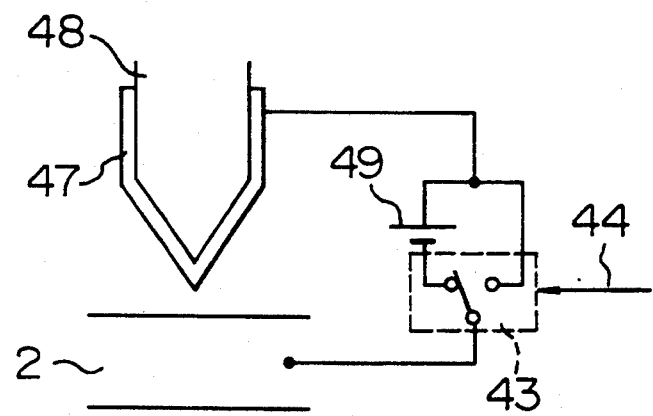
FIG. 10 is a diagram showing a structure for simultaneously measuring an electrostatic force distribution and a magnetic force distribution.

FIG. 10 is a diagram showing a probe structure according to a further embodiment of the invention. Referring to the figure, the probe is formed of a magnetic material 48. Alternatively, the probe may be covered with a magnetic material layer 48 over the surface thereof. Additionally, the probe is coated with an electrically conductive material layer 47. With the probe structure according to the instant embodiment, it is contemplated to measure or acquire simultaneously the data (or information) both for the magnetic field and the electric field. To this end, application of an electric potential to the probe from a power supply source 49 is turned on and off by means of a change-over switch 43. When the electric potential is applied to the probe, the electrostatic force becomes predominant over the magnetic force to thereby allow the electric field intensity distribution or the electrostatic force gradient distribution to be measured. By turning off the application of the electric potential or controlling the same under the control of an external signal 44 so that the magnetic force becomes predominant, it is possible to acquire the data of magnetic field distribution, magnetic force gradient distribution and others. By performing the operation mentioned above at each pixel position over the specimen surface or at desired locations, it is possible to acquire a three-dimensional distribution of the specimen surface geometries or those of magnetic and/or electric field/force gradients prevailing above the specimen surface.

Embodiment 6

Figure 11:
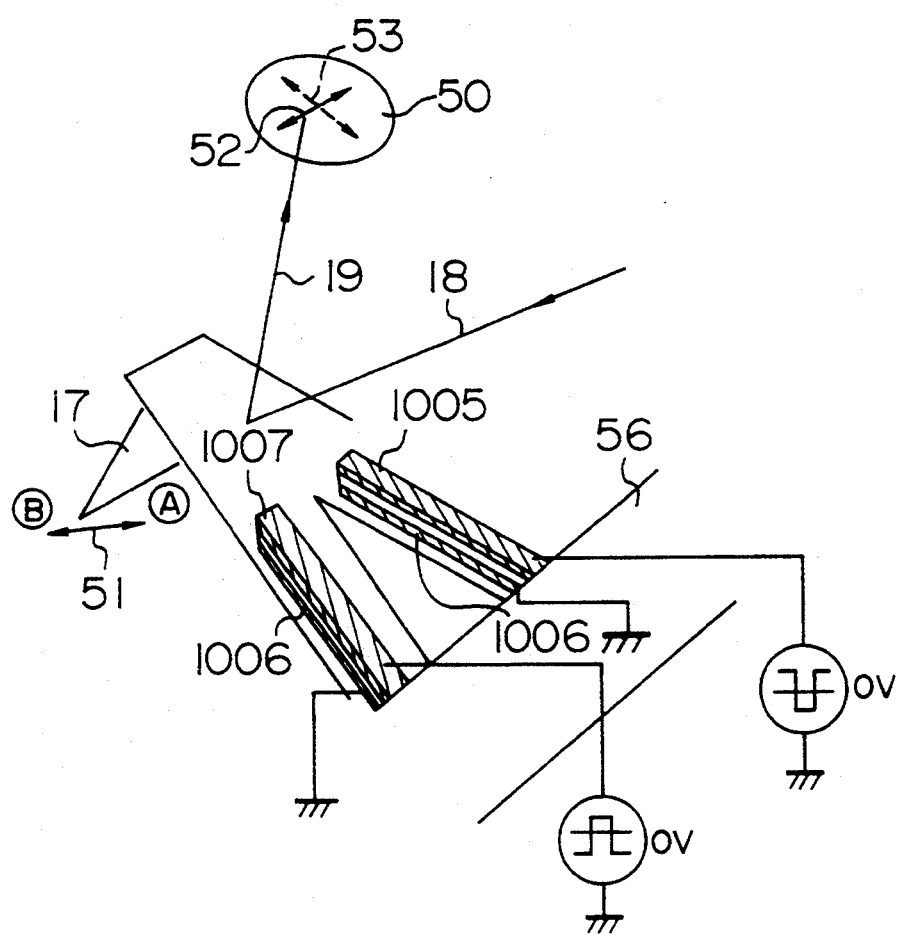
FIG. 11 is a perspective view showing schematically a structure of a cantilever according to another embodiment of the invention.

FIG. 11 is a diagram schematically showing a major portion of the apparatus according to another embodiment of the invention. With the instant embodiment, it is intended to measure magnetic field profiles and electric field distributions by vibrating the probe 17 in the direction parallel to the surface of the specimen 2. Referring to the figure, a reference numeral 50 denotes a two-dimensional position sensor diode array for detecting a reflected laser beam 19 resulting from reflection of an incident laser beam 18 at the surface of a cantilever 1 having a probe 17 mounted at a free end thereof. In the case of the illustrated structure, the reflected laser beam 19 vibrates along a path 52 in correspondence with vibration of the probe 17 along a path 51. On the other hand, the reflected laser beam 19 swings along a path indicated by a double-arrow broken line 53 in dependence on the forces acting on the cantilever in the direction perpendicular to the specimen surface. Thus, the vibration of the probe 17 in the direction parallel to the specimen surface as well as the force acting thereon in the direction orthogonally to the latter can be detected discriminately from each other by the two-dimensional sensor diode array 50. At this junction, it is desirable that the direction of vibration of the probe 17 is parallel to an end surface of a base member 56 at which the cantilever 1 is supported and that this direction coincides with the X-scanning direction of the probe 17. The vibration of the probe 17 along the path 51 can be realized by imparting torsional movement to the cantilever 1 by using piezoelectric devices. More specifically, the cantilever 1 is implemented in a bifurcated structure, wherein each of bifurcated legs is provided with a piezoelectric device constituted by a piezoelectric material 1007 sandwiched between electrodes 1005 and 1006. By applying voltages of the polarities shown in the figure to the piezoelectric devices, there takes place such torsion of the cantilever 1 that the probe 17 is moved in the direction (A). By inverting the polarities of the voltages applied to the piezoelectric devices, the probe 17 is caused to move in the direction (B). By repeating this movement of the probe 17 and the movement thereof described hereinbefore by reference to FIG. 1 or synthesizing both of these movements, the magnetic field force gradient distributions as well as the electric field force gradient distributions can be measured not only in the horizontal direction but also in the vertical direction. Further, it is possible to measure the magnetic force and the electric force on the basis of change in the low vibration frequency (lower than 5 Hz) or DC component in the state where the vibration of the probe 17 is stopped. Additionally, by combining the measurement with the probe control illustrated in FIG. 6, the magnetic field distribution (profile) and the electric field distribution can be measured with a further enhanced accuracy.

Embodiment 7

Figure 12:
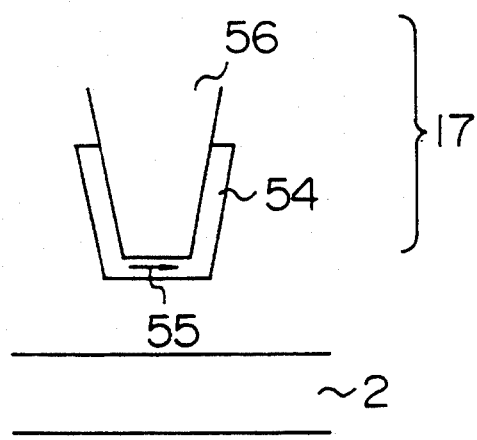
FIG. 12 is a view showing a structure of a probe for measuring a magnetic field distribution extending in parallel to a specimen surface according to an embodiment of the invention.

FIG. 12 is a diagram showing a probe structure according to a still further embodiment of the invention which is adapted to detect the magnetic field data in the direction parallel to the surface of the specimen. A magnetic layer 54 is deposited over a probe 56 through a vapor deposition process and magnetized in the direction indicated by an arrow 55 at a tip end of the probe.

With the probe structure according to the instant embodiment, the state of magnetization of the specimen surface can be measured. At this juncture, the direction of the above-mentioned magnetization of the probe should preferably be in parallel with the path 51 shown in FIG. 11.

The foregoing description of the preferred or exemplary embodiments of the invention has been made in conjunction with observation of specimen surface structure and measurements of magnetic and electric force gradients at optional heights above the specimen surface. In this conjunction, it should be mentioned that intrinsic magnetic stray field distribution and electric stray field distribution can be determined through infinite integration of the data obtained from the measurements mentioned above. Additionally, attenuation characteristics of the magnetic stray field as well as the electric stray field of the specimen surface can equally be determined. Thus, a variety of data representations are possible without departing from the spirit and scope of the present invention. Although the various embodiments of the invention have been described independent of one another, it should be understood that numerous combinations and modifications of the illustrated embodiments will readily occur to those skilled in the art within the purview or coverage of the present invention. It should further be added that the controls described above can be effectuated conveniently and easily by using a computer.

Embodiment 8

Figure 13:
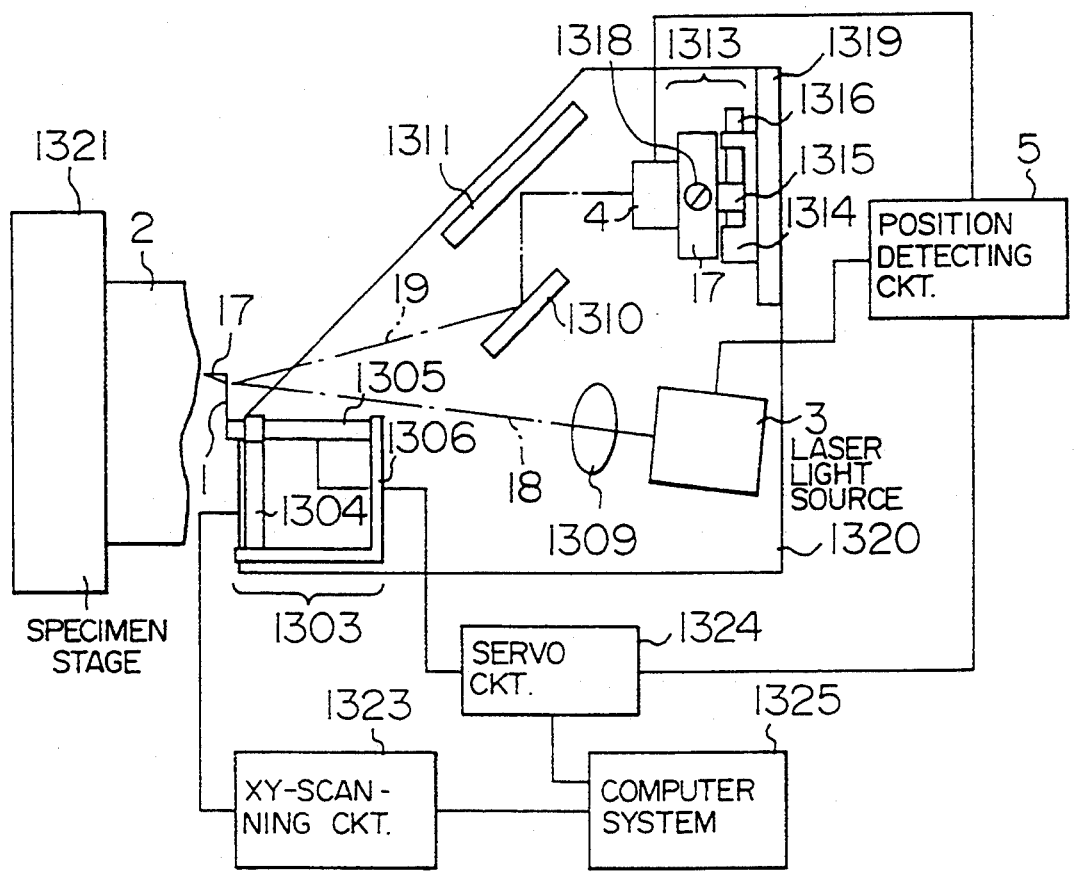
FIG. 13 is a view generally showing a structure of a surface observing apparatus according to another embodiment of the invention.

FIG. 13 is a diagram schematically showing a structure of microscope according to another embodiment of the present invention. With the instant embodiment, it is contemplated to implement a microscope which is capable of observing a specimen of a large surface area without need for cutting the specimen into fragments. An advantageous feature of this microscope is seen in a moving mechanism for a probe and a specimen. The following description will be made with importance being put on the moving mechanism and the probe, being understood that repeated description is unnecessary for the components same or equivalent to those of the preceding embodiments which are denoted by like reference symbols.

FIG. 13 show a general arrangement of the microscope in a top plan view. As can be seen from the figure, the microscope according to the instant embodiment includes a tripod type moving or scanning mechanism 1303 which serves for controllably moving a cantilever 1 having a probe 17 mounted thereon relative to a surface of a specimen 2 in the X- and Y-scanning directions and controlling the position of the cantilever 1 in the direction along the Z-axis, a microscopic force detecting mechanism for detecting a microscopic force acting between the probe 17 and the surface of the specimen 2 by detecting a deflection angle of the cantilever 1, a specimen stage 1321 for holding the specimen 1321 and a control unit which is responsible for the control of the whole apparatus.

As shown in the figure, the specimen 2 which is to undergo the surface observation or visual inspection is held on a specimen stage (also referred to as the XY-stage) 1321 and disposed with the surface facing oppositely to a tip end of the probe 17 which is supported by the cantilever 1 at a free end thereof. The other end (stationary end) of the cantilever 1 is fixedly secured to a moving member of the tripod type moving mechanism 1303, which in turn is composed of an X-axis piezoelectric device 1304 and a Y-axis piezoelectric device (not shown) for moving the cantilever 1 in the X- and Y-directions upon scanning the specimen surface and a Z-axis piezoelectric device 1305 for controlling the position of the cantilever 1 in the Z-direction. These X-, Y- and Z-axis piezoelectric devices have respective stationary end portions fixedly secured to a stationary seat member 1306 which in turn is disposed stationarily on a base 1320.

Disposed at the rear side of the cantilever 1 is a laser optical system which serves for detecting angle of deflection of the cantilever 1. The optical system is comprised of a laser light source 3, a lens system 1309, reflector mirrors 1310 and 1311, a position sensor 4 and a position adjusting mechanism (XY-stage) 1313 for adjusting the position of the position sensor 4 in the X- and Y-directions.

It is presumed that a specimen stage 1321 for holding the specimen 2 is equipped with an XY-moving mechanism in a conventional manner.

The control unit mentioned above is composed of a drive circuit for driving the laser light source 3, a position detecting circuit 5 including a detection circuit for the position sensor 4, an XY-scanning control circuit 1323 for causing the probe 17 mounted on the cantilever 1 to scan the specimen surface through the medium of the tripod type moving mechanism 130, a servo control circuit 1324 for controlling the microscopic force acting between the probe 17 and the specimen surface to be constant, and a computer system 1325 for data processing, display and for other purposes.

The aforementioned laser optical system is implemented so as to detect a microscopic force acting between the probe 17 and the specimen surface by detecting the deflection angle of the cantilever 1 on the basis of the laser beam deflection method described hereinbefore. To this end, there are required a function for effecting such adjustment that a laser beam 18 emitted from the laser light source 3 forms a light spot on a rear surface of the cantilever 1 at the free end portion thereof underneath which the probe 17 is mounted even upon exchange of the cantilever 1 together with the probe and a function for such adjustment that the reflection beam 19 reflected from the rear surface of the cantilever 1 can exactly impinge at the center of the position sensor 4. For realizing the first mentioned function, it is desirable to provide a two-axis inclination mechanism in association with the laser light source 3 and the lens system 1309 for allowing the focal position of the laser beam 18 to be adjusted, while providing a rotating mechanism in association with either one of the reflector mirrors 1310 and 1317 to thereby make it possible to adjust the optical axis of the reflection light beam for realizing the second mentioned function, although these mechanisms are omitted from illustration, being understood that implementation thereof is within the skill of the person having ordinary knowledge in the art.

Additionally, in order to ensure that the reflection light beams falls st the center of the position sensor 4 without fail, there is provided an XY-movable stage 1313 for the purpose of adjusting the position of the position sensor 4 in the X- and Y-direction, as is shown in FIG. 13. More specifically, the XY-stage 1313 is constituted by an X-movable member 1315 which is caused to move on and along a X-base 1314 fixedly secured to a stationary platform 1319 by means of an X-feed screw 1316 and a Y-movable member (not shown) which is caused to move by a Y-feed screw 1318 on and along a Y-base 1317 secured fixedly to the X-movable member 1315, wherein the position sensor 4 is stationarily disposed on the Y-movable member. With this structure, it is possible to adjust the position of the position sensor 4 in the X- and Y-directions by manually operating the X- and Y-feed screws 1316 and 1318.

Now, description will turn to operation of the apparatus.

At first, before moving the probe 17 toward the surface of the specimen 2, adjustment is performed in such manner that the laser beam 18 emitted from the laser light source 3 is focused by the lens system 1309 so as to form a light spot on the rear surface of the cantilever 1 at the free end portion thereof. Additionally, adjustment of the reflection angle of the mirrors 1310 and 1311 as well as adjustment of the position of the position sensor 4 in the X-and Y-directions through the XY-stage 1313 is performed so that the laser beam reflected on the rear surface of the cantilever 1 impinges exactly at the center of the position sensor 4 by way of the mirrors 1310 and 1311.

Subsequently, the Z-piezoelectric device 1305 of the tripod type moving mechanism is extended through electrical energization thereof to thereby move the probe 17 toward the surface of the specimen 2. When the tip end of the probe 17 closely approaches closely to the surface of the specimen 2, falling just short of physical contact with the latter (i.e. within a distance of ca. 10 Å), a microscopic or infinitesimal attraction (or repulsive force) will take effect between the tip end of the probe 17 and the surface of the specimen 2, which results in deflection of the cantilever 1 under attraction (or repulsion) and hence in the change of the deflection angle of the cantilever 1 at a portion illuminated by the laser beam 18. Consequently, the direction of reflection of the laser beam 18 undergoes a corresponding change. More specifically, the laser beam reflected from the rear surface of the cantilever 1 is deflected upwardly under the influence of microscopic or infinitesimal attraction or downwardly under infinitesimal repulsion as viewed in the figure. The deflection of the laser beam is amplified through the mirrors 1310 and 1311 on the basis of an optical lever principle, so to say, as a result of which the position of incidence of the reflected laser beam onto the position sensor 4 changes correspondingly. The change in the incidence position is detected by the position sensor 4, whereby a corresponding position detection signal is supplied to the position detecting circuit 5.

In the force constant servo mode, the position signal supplied from the position servo 4 is converted through the microscopic force detection circuit 1322 into a signal representative of the force which is effective between the probe 17 and the specimen surface, the signal resulting from the conversion being input to the servo control circuit 1324. On the basis of this input signal, the servo control circuit 1324 controls extension of the Z-piezoelectric device 1305 to thereby control the position of the tip end of the probe 17 in the Z-direction, whereby the magnitude of the microscopic or infinitesimal force acting between the probe and the specimen surface is maintained to be constant. In the state in which the microscopic force is maintained constant through the servo control, the XY scanning circuit 1323 is operated to scan the specimen surface with the probe 17 in the X- and Y-directions by energizing the X-piezoelectric device 1304 and the Y-piezoelectric device (not shown) in a manner descried hereinbefore. In this way, changes in the position of the probe tip end in the Z-direction in the course of the specimen surface scanning by the probe 17 in the X- and Y-directions can be read out in the form of extension and contraction of the Z-piezoelectric device 1305. On the basis of the changes in the probe position in the Z-direction taking place during the surface scanning by the probe, the computer system can generate a three-dimensional image representing geometries such as roughness of the specimen surface in a gray scale image, a bird's eye image (perspective image) or the like.

As will be understood from the above, it is now possible according to the instant embodiment of the present invention to observe or visually inspect given surface areas of a specimen of large size owing to the provision of the XY-stage 1321 for the specimen which allows the specimen to be moved in a plane over a wide range in contrast to the hitherto known apparatus provided wit the tripod type moving mechanism for the probe in which observation was limited to a specimen having an area of 10 mm² at maximum. In other words, in the microscope according to the invention, a specimen having a large area can straightforwardly be observed with no need for cutting it into fragments.

Figure 14:
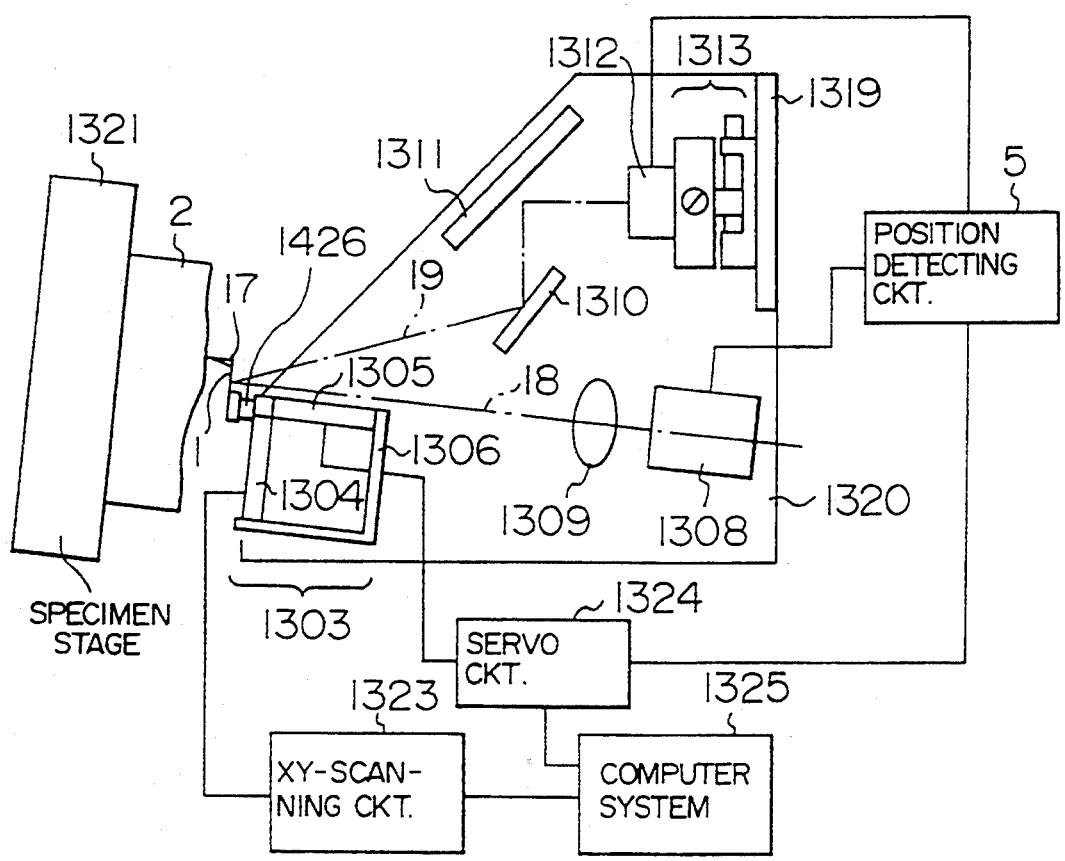
FIG. 14 is a view generally showing a structure of a surface observing apparatus according to another embodiment of the invention.

FIG. 14 shows a microscope structure according to another embodiment of the invention in which the probe 17 is mounted at an angle other than a right angle relative to the cantilever 1. In that case, it is desirable that the probe 17 is oriented in opposition to the specimen 2 at a right angle relative to the specimen surface. Further, even when the probe is not mounted in the cantilever 1 at a right angle relative to the cantilever surface, the X-piezoelectric device 4 as well as the Y-piezoelectric device (not shown) which constitute the tripod type moving mechanism 1303 are required to be installed in parallel with the surface of the specimen stage 1321 or that of the specimen 2 with the z-piezoelectric device 1305 being installed orthogonally to the above-mentioned surface. In the structure shown in FIG. 14, the X-piezoelectric device 1304 does not extend in parallel to the cantilever surface either. In the microscope structure which the instant embodiment of the invention dare concern, the cantilever 1 is coupled to the tripod moving mechanism 1303 through an adapter 1426 interposed therebetween. In this case, consideration will have to be paid to error in measurement which takes place due to parallel movement of the reflected laser beam 19 impinging on the position sensor 4 in the course of the scanning in the X- and Y-directions. However, according to the teaching of the invention which is based on the laser beam deflection method or optical lever principle, the measurement error mentioned above can practically be neglected.

Similarly, movement of the probe 17 in the Z-direction tends to be accompanied with error due to the parallel movement of the cantilever 1 not only in the structure shown in FIG. 14 but also in the one shown in FIG. 13. However, the error is of such extent that can duly be neglected because of adoption of the laser beam deflection method (or optical lever principle).

Next, errors ΔX and ΔY due to parallel movement or translation of the reflected laser beam on the position sensor 4 which errors take place upon movement of the cantilever 1 in the X- and Y-direction will be discussed by reference to FIG. 15. It is assumed that the cantilever 1 is inclined at an angle θ relative to the X-direction and that the laser light beam 18 is incident on the rear surface of the cantilever 1 and reflected therefrom at an angle φ. When the cantilever 1 is moved in the X- and Y-directions by distances X and Z, respectively, in the state mentioned above, then the errors ΔX and ΔZ can be given by the following expressions (1) and (2), respectively.

$$\Delta X = 2X \sin \theta \sin (\phi/2) \quad (1)$$

$$\Delta Z = Z \sin \phi \quad (2)$$

Typically, the angles φ and θ assume values of about 20° and 30°, respectively. Accordingly, assuming that the displacements X and Z are each 1 μm, the translation errors ΔX and ΔZ occurring on the position sensor 4 is each smaller than 1 μm. On the other hand, concerning the sensitivity of the microscopic or infinitesimal force detection based on the optical lever principle, it is noted that the angle of detection of the cantilever 1 which occurs due to the microscopic force acting between the tip end of the probe 17 and the surface of the specimen 2 is amplified by a factor on the order of "8" due to the reflection on the rear surface of the cantilever and the reflections at the two mirrors 1310 and 1311. Furthermore, assuming that the distance between the fixed end of the cantilever 1 and the position at which the laser beam is reflected from the rear surface of the cantilever is 100 μm with the distance to the position sensor 4 from the cantilever 1 being 100 mm, then magnitude of movement or displacement of the probe 17 can be detected by the position sensor 4 as the displacement of the optical axis of the reflected laser beam with an amplification factor of about ten thousands. This is the principle underlying the laser beam deflection method or the optical lever principle. Assuming that the probe 17 secured at the free end of the cantilever 1 displaces by 1 Å, then the reflected laser beam impinging on the position sensor 4 moves about 1 μm as the translation. The translation (parallel movement) of 1 μm corresponds to a microscopic or infinitesimal force of about $10^{-10}$N because the spring constant of the cantilever 1 is usually on the order of 1N/m. Consequently, the error in the detection of the microscopic force due to translation of the reflected laser beam which accompanies the scanning operation of the cantilever 1 in the X- and Y-directions is on the order of $10^{-10}$N per 1 μm of scanning in the X- and Y-directions, which is sufficiently small when compared with a microscopic force value of $10^{-9}$ to $10^{-8}$N which is usually encountered in the surface observation based on the microscopic force detection. Thus, it is safe to say that the error in the microscopic force detection brought about by the translation of the reflected laser beam in the X- and Y-scans over a distance of several microns can duly be neglected.

As will now be understood from the above description, change in the microscopic force can be detected with a sufficiently high accuracy even when the specimen surface is scanned with the probe 17 in the X- and Y-directions by virtue of such arrangement that change in the microscopic force acting between the tip end of the probe 17 and the surface of the specimen 2 is detected through detection of change in the angle of deflection of the cantilever 1 in accordance with the laser beam deflection method or optical lever principle. At this juncture, it should be added that the influence of the detection errors mentioned above can further be decreased by using the cantilever of a smaller spring constant or by increasing the amplification or magnification factor of the optical lever system including the laser beam optical system and the cantilever.

Embodiment 9

Figure 16A:
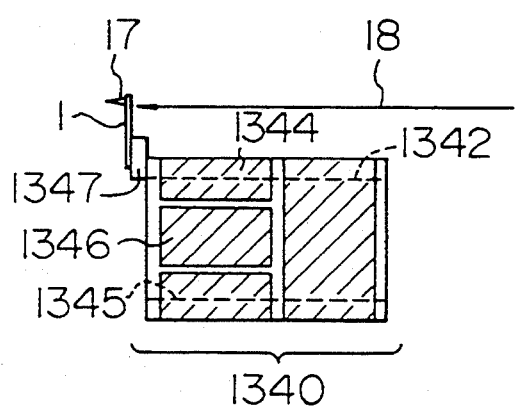
FIGS. 16a and 16b are diagrams showing a major portion of the microscopic surface observing apparatus according to still another embodiment of the invention.
Figure 16B:
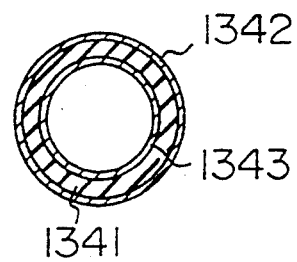

FIGS. 16a and 16b are diagrams showing a major portion of the microscopic surface observing apparatus according to still another embodiment of the invention. In the case of this embodiment, a cylinder type moving mechanism 1340 is used instead of the tripod type moving mechanism 1303. In the case of the cylinder type moving mechanism 1340, it is important to mount the cantilever 1 at an outer peripheral portion as viewed in the radial direction so that an optical microscope can be used for setting the optical lever system such that the laser light beam 18 can impinge on the rear surface of the cantilever 1 at the free end portion thereof where the probe is mounted at the opposite side. Of course, in the case where the cylinder type moving mechanism 1340 has a sufficiently large diameter to allow the rear surface of the cantilever to be observed with an optical microscope through an inner space available within the cylinder type moving mechanism 1340, the cantilever may alternatively be mounted on an inner peripheral portion of that moving mechanism as viewed in the radial direction thereof. However, in view of the necessity for ensuring availability of the optical path for incidence and reflection of the laser beam 18 in order to detect the angle of deflection of the cantilever 1, it is usually preferred to install the cantilever 1 at a radially outer peripheral portion of the cylinder type moving mechanism 1340. More specifically, in the case of the illustrated structure, the cantilever denoted by 1A in this case is mounted on the cylinder type moving mechanism 1340 at a movable end portion thereof through interposition of an adapter 1347 so that the free end portion of the cantilever 1 can extend over a sufficiently large distance from the radially outer peripheral portion of the cylinder type moving mechanism 1340. The moving mechanism 1340 includes a cylinder 1341 made of a piezoelectric material and electrodes 1342 to 1346 formed by applying an electrically conductive material over inner and outer surfaces of the piezoelectric cylinder and hardening the same by baking. More specifically, the cylindrical outer electrode 1342 is used for the servo control in the Z-direction while four outer electrode divisions 1344, 1345 and 1346 (the other one electrode division being omitted from illustration) are destined for use in the specimen scanning in the X- and Y-directions. The inner cylindrical electrode 1343 serves as an opposite electrode common to the outer electrodes 1342 to 1346.

Embodiment 10

Figure 17:
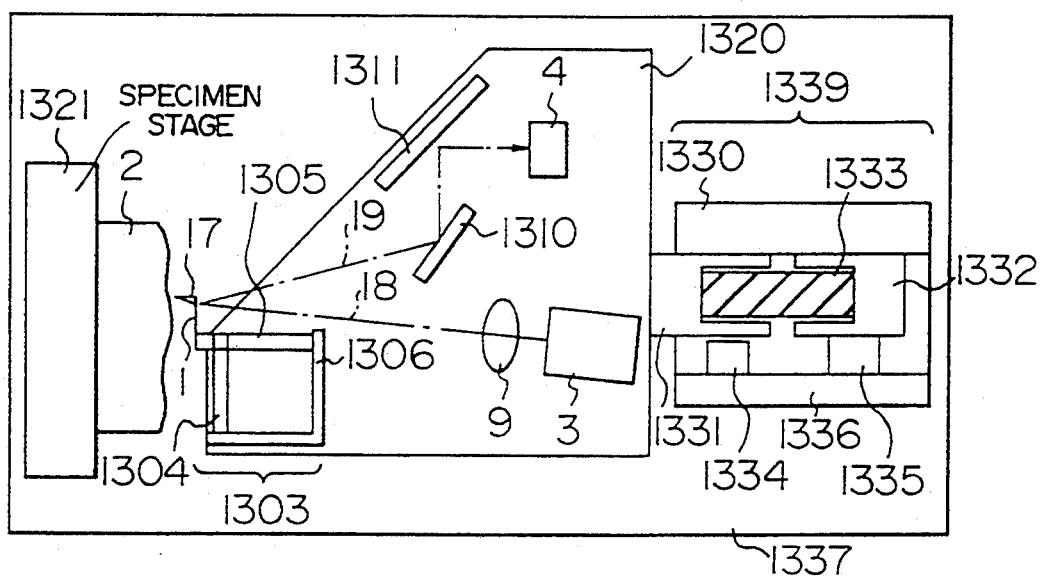
FIG. 17 is a block diagram showing a general structure of a specimen observing apparatus according to still another embodiment of the invention.

FIG. 17 is a diagram showing a microscopic observation apparatus according to yet another embodiment of the invention in which a base 1320 having mounted thereon a tripod type moving mechanism 1303 holding a cantilever 1 with a probe 17 and a microscopic force detection mechanism (3, 4, 9, 1310, 1311) is mounted on an inchworm type stepwise fine moving mechanism generally denoted by a numeral 1339. The structure according to the instant embodiment is very advantageous particularly when given microscopic areas on the surface of a large size specimen are to be observed by moving the specimen 2 over a wide range in the X- and Y-directions. In such application, not only the three-dimensional fine moving mechanism for the probe 17 and the microscopic force detecting mechanism but also the Z-coarse moving mechanism used for approaching the probe 17 to the specimen surface should preferably be installed all at one side of the probe. To this end, an XY-state 1321 for holding a specimen 2, the three-dimensional moving mechanism 1303 for the probe and the microscopic force detecting mechanism (3, 4, 9, 1310, 1311) are mounted on a base or platform 1320 which in turn is mounted on a front-side movable member or carriage 1331 of the inchworm type stepwise fine moving mechanism 1339 which is installed stationarily on the standard base 1337. With the structure in which the platform 1320 is slidably moved on the standard base 1337 by means of the inchworm type stepwise fine moving mechanism 1339, there can be realized a microscope structure having an increased capability for withstanding vibrations and other external disturbances. Thus, the structure according to the instant embodiment is preferably suited for a microscope designed for observation of an extremely fine surface structure of a specimen.

The inchworm type stepwise fine moving mechanism 1339 includes a guide 1330, a piezoelectric device 1333 serving as a mover, front-side (left-hand side) and rear-side (right-hand side) movable members 1331 and 1332 mounted at front and rear ends of the mover piezoelectric device 1333, respectively, front-side and rear-side clamps 1334 and 1335 and a clamp supporting plate 1336. In the structure of the inchworm type fine moving mechanism 1339, consider operation thereof in the case where the probe 17 is to be moved toward the surface of the specimen 2. In the initial state, both front-side movable member 1331 and the rear-side movable member 1332 are held stationarily under the clamping actions exerted by both the front-side and rear-side clamps 1334 and 1335, respectively. Starting from this state, the front-side movable member 1331 is released from the clamping action of the front-side clamp 1334. Subsequently, the mover piezoelectric device 1333 is extended to thereby move the front-side movable member 1331 in the direction toward the specimen 2. Then, the front-side movable member 1331 is clamped stationarily by means of the front-side clamp 1334. Next, the rear-side movable member 1331 is released from the clamping action of the rear-side clamp 1335, which is followed by contraction of the mover piezoelectric device 1333 to thereby allow the rear-side movable member 1332 to move toward the specimen 2. Thereafter, the rear-side movable member 32 is clamped stationarily by the clamp 1335. The overall result is that both the front-side and the rear-side movable members 1331 and 1332 have been moved in the direction toward the specimen by one step which usually corresponds to about 10 μm.

By repeating the stepwise fine increment movement described above at a high rate, the probe 17 mounted stationarily on the base 1320 is caused to approach progressively to the surface of the specimen 2. This operation is continued until the angle of deflection of the cantilever 1 and hence the microscopic force effective between the probe 17 and the specimen 2 has attained a predetermined level or value, whereupon the operation for moving stepwise the base 1320 toward the specimen 2 is stopped once, and the extension of the mover piezoelectric device 1333 is adjusted to such a base position that the Z-piezoelectric device 1305 of the probe moving mechanism can follow satisfactorily profile of the specimen surface. Starting from the state thus attained, the tripod type probe moving mechanism 1303 is operated, as described previously in conjunction with the embodiment shown in FIG. 13. The specimen surface can thus be observed in the microscopic force constant mode. Alternatively, the specimen surface can be observed in a microscopic force constant mode by moving the probe 17 in the X- and Y-scanning direction without effecting the servo control thereof in the Z-direction.

When another area on the specimen surface is to be observed, the probe 17 is once moved away for a sufficient distance from the specimen surface by operating the inchworm type stepwise fine moving mechanism 1339. Thereafter, the XY-stage 1321 is manipulated to move the specimen 2 to a position at which the area of concern is positioned oppositely to the probe 17. Subsequently, the probe 1 is again moved closely to the surface of the specimen 2 by means of the stepwise fine moving mechanism 1339 through the similar procedure described above to observe the specimen surface structure in the area of concern. Although the inchworm type stepwise fine moving mechanism 1339 of the structure described above has been assumed to be employed in the case of the illustrated embodiment, it will readily be appreciated that other approaching mechanisms such as those using a conventional electric motor, a shrinkage mechanism or the like solely or in combination with a reduction gear transmission device may be employed as modifications of the instant embodiment without departing from the spirit and scope of the present invention. Further, it goes without saying that the approaching mechanism of the base 1320 disposed horizontally may be oriented in a vertical disposition to the same effect.

It is noted that in the case of the illustrated embodiment the scanning mechanism 1303 which can assure an extremely fine movement of the probe 17 is necessarily limited in respect to the coverage for the scanning operation. Accordingly, when a microscopic area is to be searched from a large specimen surface for observation by manipulating the XY-stage or specimen stage, i.e., upon selection of the field of view, combination with a scanning electron microscope (SEM), a transmission electron microscope (TEM) or an optical microscope (OM) is very beneficial. Such combination falls of course within the purview of the invention.

Further, as another preferred modification of the instant embodiment, there is conceived a combination of the surface microscope of the structure shown in FIG. 17 with a scanning electron microscope (SEM) for use as a length measuring apparatus for measuring a pattern size of a specimen surface undergone a fine processing. In that case, a whole pattern is first observed through the scanning electron microscope, and then an area where a three-dimensional structure geometry is of concern or an extremely fine pattern or structure which cannot be evaluated by the scanning electron microscope is observed with the aid of the surface microscope according to the invention. In this manner, microscopic inspection of an extremely minute part resulting from a semiconductor process, magnetic disk manufacturing process or the like process can be carried out with a very high accuracy.

The probe 17 mounted the cantilever 1 at the free end thereof may preferably be made of an electrically conductive material. In that case, the apparatus according to the invention can find application to a tester for examining electrical characteristics of a semiconductor device such as a high-frequency characteristic, distribution of potential and the like by utilizing a tunneling current or a field emission current of the probe 17 or a current flow occurring upon contact of the probe 17 with a specimen surface. These adaptations are also covered by the present invention. In this conjunction, it is obvious that the surface microscope according to the invention is operated under vacuum when it is used in combination with the scanning electron microscope or the like.

Furthermore, by coating the probe 17 with a magnetic material or by forming it of a magnetic material, the apparatus according to the invention can operate as a magnetic force microscope for straightforward observation or examination as to magnetic characteristics of a specimen having a large area such as a magnetic disk or the like with no need for cutting the specimen into fragments. In this case, combination of the inventive apparatus with a scanning electron microscope, a transmission electron microscope or an optical microscope is conceivable as well without departing from the scope of the invention.

As another application of the apparatus according to the invention, there may be mentioned a recording apparatus. To this end, a coil may be wound around the probe of a magnetic material for generating a magnetic field to perform magnetic recording on a specimen of a magnetic material, for thereby writing information or data by modulating correspondingly a current flowing through the coil. On the other hand, the record bits can be read out as magnetic distribution by making use of the principle underlying the magnetic force microscope or alternately by utilizing an electromotive force induced in the coil. In that case, the specimen moving mechanism 1321 may conveniently be implemented as a magnetic disk type r-$\theta$ moving mechanism. Additionally, the present invention can be applied to an atom manipulation process or a pattern forming process of atomic order or nanometer order by making use of a magnetic field vaporization phenomenon taking place in the specimen or probe upon application of an electric field of high intensity between the specimen and the probe or a deposition phenomenon occurring due to gas decom-position ascribable to the tunneling current or a resist decomposition phenomenon. By selectively combining these features of the invention with an electron beam pattern depicting method, it becomes possible to form even an extremely fine or microscopic pattern which is difficult to realize solely with the electron beam depicting method.

As an exemplary application, a combination of the surface microscope according to the invention with a scanning electron microscope (SEM) has been described which allows a surface observation or inspection over a wide range from a global observation of a large size specimen to an atomic order. In this conjunction, it should further be mentioned that when an auger electron detector, a reflected electron detector or an absorbed electron detector is used in place of a secondary electron detector employed usually in the scanning electron microscope, there can also be obtained such specimen surface information as an auger electron image, a reflected electron image, an absorbed electron image, an induced current image or the like. Besides, by combining the surface microscope according to the invention with a transmission electron microscope or a reflection electron microscope in place of the scanning electron microscope, observation of an internal specimen structure as well as evaluation of crystalline structure can be conducted. In this conjunction, it is also obvious that an electron beam diffraction method can equally be utilized.

Moreover, by combining the surface microscope according to the invention with a secondary ion mass spectroscopy (SIMS) which permits an element analysis of a specimen surface or in the thicknesswise direction of a specimen, or alternatively by combining the inventive surface microscope with a spectrochemical analysis to thereby constitute a scanning tunneling current spectrometer (STS) for spectroscopically analyzing radiation rays emitted through excitation by a tunneling current flowing through the tip end of the probe, element analysis of an infinitesimally small part of the specimen surface can be performed.

In the case of the illustrated embodiment, it is assumed, by way of example, that a gap length between the tip end of the probe and the specimen surface is held stationary upon observation of the specimen surface. It should however be appreciated that the teachings of the invention can equally be applied to a vibration type atomic force microscope and a magnetic force microscope in which the probe-specimen gap length is varied at a given frequency. These microscopes of course fall within the purview of the present invention. Furthermore, the invention can be applied without departing from the spirit and scope thereof to an atomic force microscope, a magnetic force microscope or the like of such type in which a strain wave produced internally of a specimen due to changes in the atomic force or magnetic force or alternatively a transmitted or reflected sound wave is made use of for observation or analysis.

Embodiment 11

Figure 18:
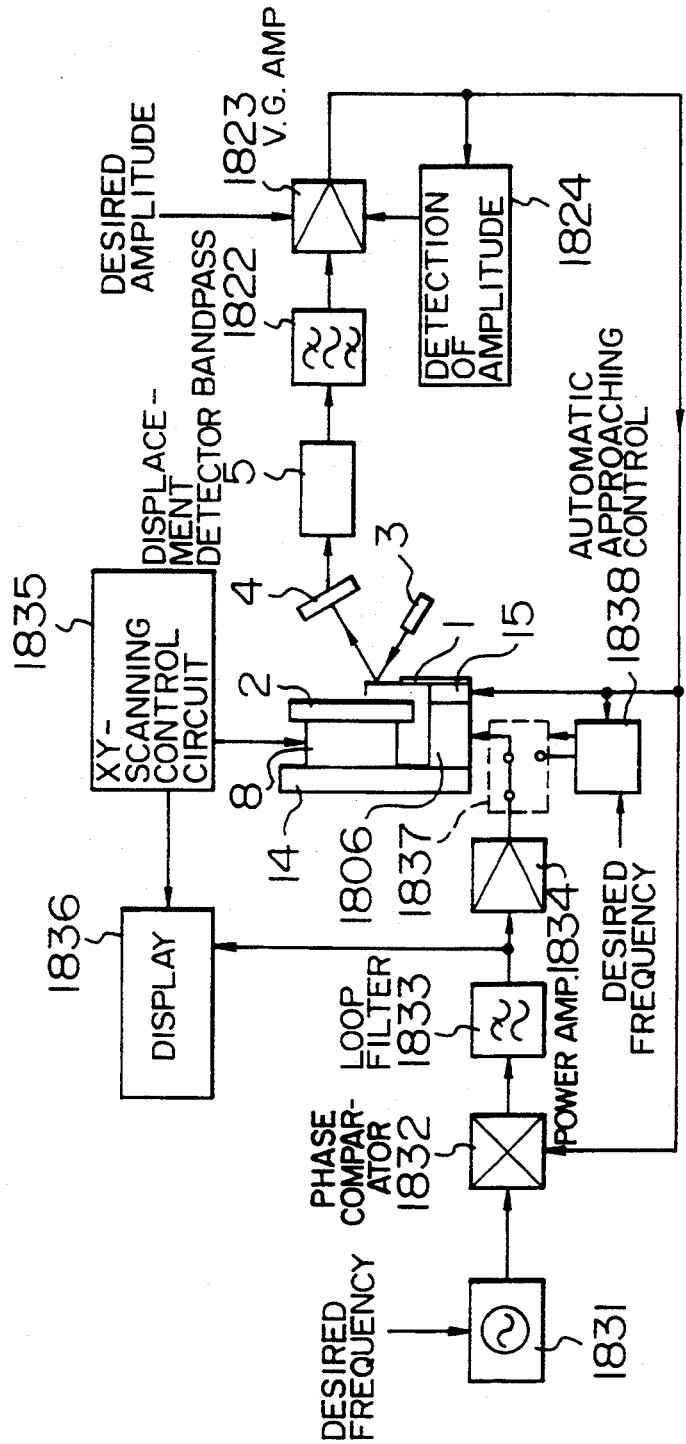
FIG. 18 is a block diagram showing a structure of an apparatus according to a further embodiment of the invention.

FIG. 18 generally shows a structure of a surface microscope according to a further embodiment of the invention. In the case of the instant embodiment, an oscillation circuit composed of a position detector, a variable gain amplifier and a piezoelectric device is provided for the purpose of detecting displacement or movement of the cantilever 1. The oscillation circuit is stabilized in respect to the frequency by means of a reference signal generator, wherein a Z-actuator serves to adjust the oscillation frequency by changing distance between the tip end of the cantilever and the specimen. Except for these features, other components are same as or equivalent to those of the embodiments described hereinbefore and denoted by like reference symbols.

The displacement detector 5 according to the instant embodiment of the invention serves for signal amplification, filtering, elimination of influences of variation in a light source intensity. With the instant embodiment, only alternating current components are derived with DC component being cut off. The output signal of the position detector 5 is applied to the input of the variable gain amplifier 1823 after noise components have been removed through a band-pass filter 1822. The output of the variable gain amplifier 1823 is monitored by an amplitude detection circuit 1824. The variable gain amplifier 1823 is designed to automatically control the gain thereof so that the output of the amplitude detection circuit 1824 coincides with a desired value supplied thereto externally. The output of the variable gain amplifier 1823 is applied to a piezoelectric device 15. In that case, phase adjustment is so effected that the vibration applied to the cantilever 1 by the piezoelectric device 15 is in phase with the displacement or movement of the cantilever 1 at a resonance frequency of the latter. In other words, a positive feedback is effectuated. Consequently, when the loop gain exceeds "1", this system starts to oscillate at the resonance frequency of the cantilever 1. In the following description, it is assumed that the loop is in the oscillating state.

A part of the oscillation signal is applied to one input terminal of a phase comparator 1832. The other input of the phase comparator 1832 is a reference frequency signal supplied from a reference oscillator 1831 which has to be constituted by an oscillator having a high frequency stability such as a crystal control oscillator or the like. Besides, the reference oscillator 1831 is required to exhibit an excellent phase stability with the oscillation frequency being variable. As a typical one of such reference oscillator, there may be mentioned an oscillator of a frequency synthesizer type which includes a crystal control oscillator as a standard. The phase comparator may be implemented by using a multiplier. In the case of the instant embodiment, the phase comparator is realized by a multiplier.

Figure 19:
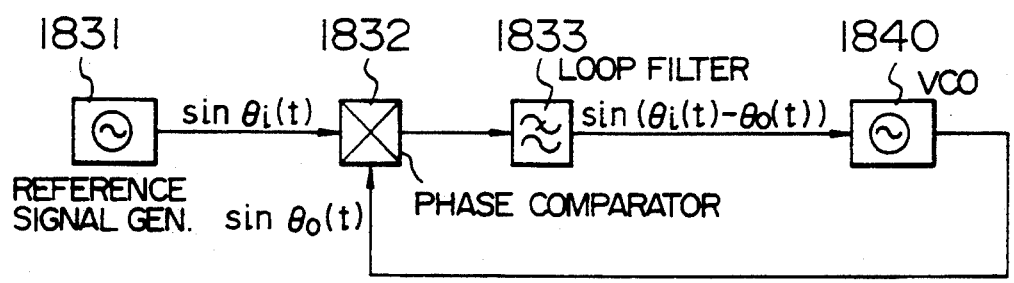
FIG. 19 is a schematic circuit diagram showing a circuit configuration employed in the apparatus according to an embodiment of the invention.

FIG. 19 is a diagram showing a major portion of the arrangement shown in FIG. 18. From the viewpoint of the electric circuit technology, the oscillation loop including the cantilever 1 constitutes a voltage-controlled oscillator 1840 in the sense that the oscillation frequency can be modified by regulating the distance between the tip end of the probe mounted at a free end of the cantilever 1 and a specimen surface by means of the Z-actuator, because the resonance frequency of the cantilever 1 can vary as a function of the above-mentioned distance. As can be seen in FIG. 19, this system constitutes a phase-locked loop (PLL). When the frequency of the reference oscillator and that of the voltage controlled oscillator lie sufficiently closely to each other, the phase difference between the two signals is approximately zero in the system of FIG. 19, resulting in that the oscillation frequency of the voltage controlled oscillator coincides with that of the reference signal. This is the phase-locked state. The characteristic of the voltage controlled oscillator is so established with regard to the relation between the control voltage (output of the phase comparator) of the voltage controlled oscillator and the oscillation frequency thereof that the phase difference approaches to zero. More specifically, when the tip end of the cantilever is caused to approach to the specimen surface, the oscillation frequency becomes lowered. Accordingly, in the case of the arrangement shown in FIG. 18, the output of the phase comparator may be input to the Z-actuator simply by adding an offset voltage of appropriate magnitude. However, in contrast to a conventional phase comparator where the operating voltage is on the order of several voltages, there is required as high a voltage as several tens of volts for driving the Z-actuator realized by the piezoelectric device in the case of the illustrated embodiment. Accordingly, a power amplifier 1834 has to be provided with an offset voltage being applied to this amplifier as well.

The phase lock technique is widely adopted in the field of communication systems, control systems, etc. For example, reference may be made to Roland Best: "Phase-Locked Loops", McGraw-Hill, Inc. (1984) and Floyd Gardner: "Phase Lock Techniques", John Wiley & Sons (1966).

Next, description will turn to a relation existing between the resonance frequency of the cantilever and a force acting on the latter. An equation of motion of the cantilever can be given by the under-mentioned expression 4 in view of the fact that the cantilever is forced to vibrate at the presence of potential of the specimen surface.

$$m\{\partial^2(z-a)/\partial t^2\} = -k(a-a) - \Gamma\{\partial(z-a)/\partial t\} - -\{\partial V(z)/\partial Z\} + Fe^{i\omega t} \quad (4)$$

where m represents an effective mass k represents a spring constant of the cantilever, $\Gamma$ represents a drag coefficient, V(z) represents the potential, F represents amplitude of a cantilever driving force; a represents z-coordinate of an equilibrium point of the cantilever, and $\omega$ represents an angular frequency of external force. Shift of the resonance point under the influence of the potential can be determined by approximation on the presumption that the amplitude of vibration of the cantilever is sufficiently small in the vicinity of the equilibrium point of the cantilever, as can be given by the following expression (5).

$$\Delta\omega = 0.5\omega_{R0}\{f'(a)/k\} \quad (5)$$

$$\omega_{R0} = \sqrt{(k/m)}$$

$$f'(z) = \partial f(z)/\partial z$$

$$f(z) = -\partial V(z)/\partial z$$

Figure 20:
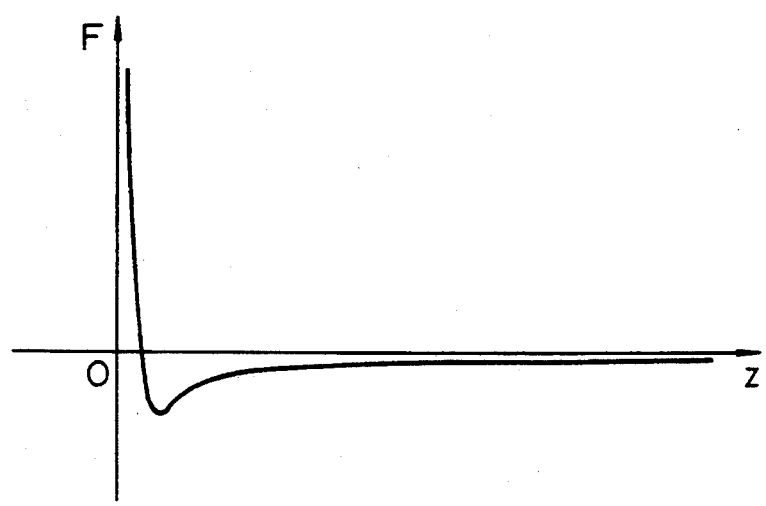
FIG. 20 is a view graphically showing a relation between a force F acting on a cantilever and a distance z between a probe tip end of the cantilever and a specimen surface.

FIG. 20 is a view graphically showing a relation between force F acting on the cantilever and a distance z between the probe tip end of the cantilever and a specimen surface when the probe tip end of the cantilever is caused to approach the specimen surface. In the case of the apparatus according to the instant embodiment, the force acting on the cantilever lies in a magnetic region, i.e., the force lies in a region of attraction, as can be seen in FIG. 20. Accordingly, the differential coefficient of the force n the Z-direction assumes a negative (minus) value. This means that the oscillation frequency of the oscillation circuit becomes lowered as the probe tip end of the cantilever is moved toward the specimen surface.

Figure 21:
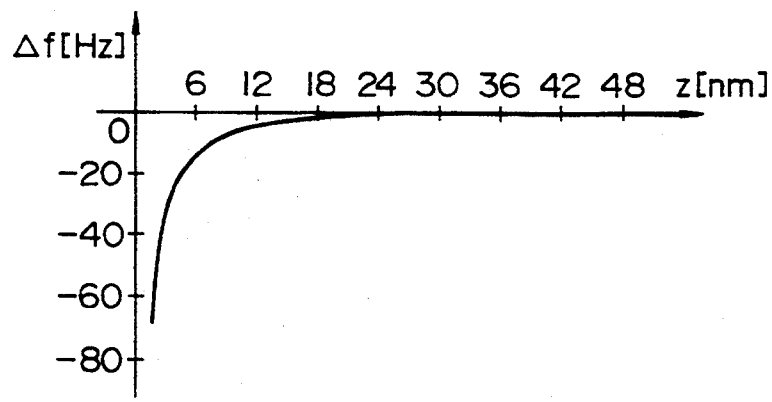
FIG. 21 is a view graphically showing a relation between a frequency change upon shifting of a resonance point of a cantilever and a distance between a specimen surface and a tip end of a cantilever, the relation being experimentally obtained by moving a cantilever toward the specimen surface.

FIG. 21 is a view graphically showing a relation between a frequency change $\Delta f$ in the shift of the resonance point of the cantilever and a distance z between a specimen surface and the tip end of a cantilever, the relation being experimentally observed by moving the cantilever toward the specimen surface. It can be seen that the oscillation frequency decreases as the distance z becomes shorter.

Now, operation generally of the apparatus according to the instant embodiment of the invention will be described by reference to FIG. 18.

The oscillation frequency of the standard oscillator is set at a value lower than a resonance frequency in the free state of the cantilever. Initially, a change-over switch 1837 is in the state closed to an automatic approaching control unit 1838. At this time point, the Z-actuator 1806 is in the state stretched completely, while the oscillation circuit oscillates at a resonance frequency corresponding to the free state of the cantilever. The automatic approaching control unit 1838 includes a circuit for detecting the oscillation frequency of the oscillation circuit and a circuit for driving the Z-actuator as well as a function for automatically changing over the switch 1837. The oscillation frequency of the standard oscillator is supplied to the automatic approaching control unit 1838 as a desired frequency value.

The automatic approaching control unit 1838 shrinks progressively the Z-actuator 1806. In the region where the influence of potential becomes effective, the oscillation frequency becomes progressively low toward the desired value, when the former approach sufficiently closely to the latter, the automatic approaching control unit 1837 automatically changes over the switch 1837, whereupon the apparatus starts to operate in the phase locked loop. In other words, the system under consideration drives the Z-actuator so that the oscillation takes place at the desired frequency. In this manner, the distance between the probe tip end of the cantilever and the specimen surface is controlled automatically.

Assuming that the probe tip end of the cantilever responds to an atomic force exclusively, when the XY-scanning device is driven under the control of the XY-scanning control unit 1845 in this state, the probe tip end of the cantilever follows a path on a plane-over which the oscillation frequency remains constant, i.e., a plane spaced from the specimen surface by a constant existence. Thus, an atomic force microscope is realized. The scan signal of the XY-scanning control unit is outputted to a display unit 1836 as well. Besides, the display unit 1836 is also supplied with the control voltage of the oscillation circuit, i.e., roughness information of the specimen surface, which information is displayed a every scanning position. In this conjunction, when the probe tip end of the cantilever is formed of a ferromagnetic material, the information as displayed contains information concerning a stray magnetic field of the specimen if it exists. Then, the apparatus can function as a magnetic force microscope. Furthermore, when the cantilever tip end probe is sensitive to electrostatic force or other forces, information regarding these forces becomes available as well.

It should be mentioned that the force which can be detected with the inventive apparatus is only the differential coefficient of the force acting on the cantilever probe tip end in the Z-direction. However, by sweeping the frequency of the standard or reference oscillator in a same scanning position, it is possible to detect the distances from the specimen surface at each value of the differential coefficient, which in turn means that change in the differential coefficients of the force in the Z-direction can be determined. By integrating the differential coefficient in the Z-direction, the force acting on the cantilever probe can be determined except for the DC component thereof.

An advantageous feature of the instant embodiment is seen in that the oscillation circuit is locked in phase to the standard or reference oscillator which is highly stabilized in respect to he frequency and phase. By virtue of this arrangement, the output of the voltage controlled oscillator which is inherently rather poor in the frequency stability can enjoy an extremely high stability. The oscillation circuit used in the instant embodiment of the invention is rather poor in the frequency stability when it is operated in the air because of low value of the cantilever spring constant on the order of 200. However, it has been confirmed that the frequency stabilization can surprisingly be improved by adopting the phase lock technique described above, being accompanied with significant reduction of noise in the output signal.

Another advantageous feature of the instant embodiment is seen in that noise level of the oscillation circuit is extremely low. The spatial resolution power particularly in the Z-direction can be enhanced when the vibration amplitude of the cantilever is small. Accordingly, small amplitude is preferable. However, in that case, difficulty will be encountered in ensuring a stable oscillation even at a high noise level. In this respect, the noise level is reduced to a possible minimum owing to adoption of the phase lock technique in the case of the instant embodiment. Thus, a stable oscillation can successfully be realized even when the amplitude is small (with the vibration amplitude of the cantilever being small). Ultimately, a high spatial resolution power can be obtained.

Embodiment 12

Figure 22:
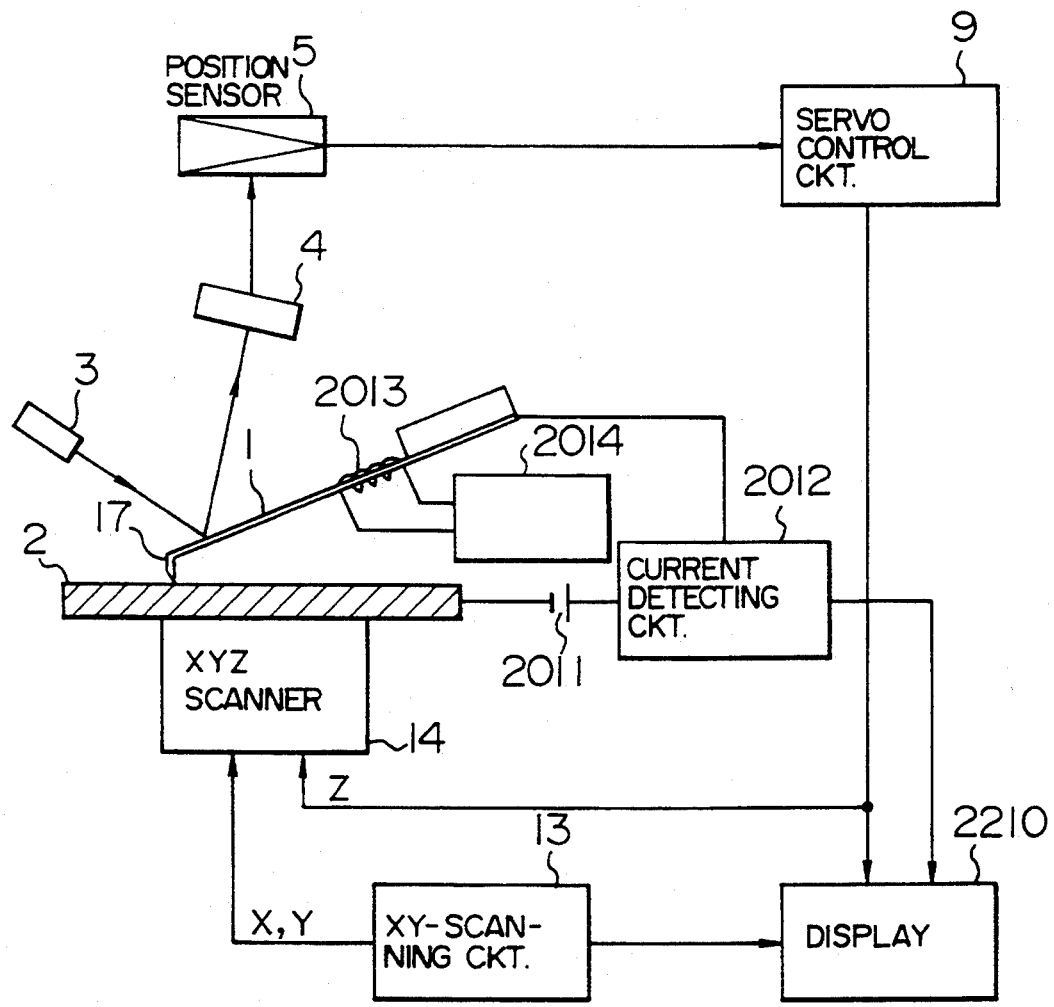
FIG. 22 is a block diagram showing another structure of the circuit according to the invention.

FIG. 22 is a diagram showing another embodiment of the invention. Arrangement as well as operations of the probe 17, the cantilever 1, the specimen 3, the position sensor 4, the position detecting circuit 5, the servo control circuit 7, the XY-scanner 14 and other are basically similar to those of the apparatus shown in FIG. 1.

According to the teaching of the invention incarnated in the instant embodiment, there is used as the probe 17 a ferromagnetic probe which is spin-polarized in a specific direction, e.g. in the direction perpendicular to the specimen surface, wherein a tunneling current flowing between the probe 17 and the specimen 2 is detected. More specifically, the tunneling current is detected by a current detector 2012 in the state where a tunneling bias 2011 is applied between the probe 17 and the specimen 2. By supplying the output signal produced by the current detector 2012 at probe positions in the XY-directions to the display unit 2210 in synchronism with a control signal for the Z-piezoelectric device, there is made available magnetic information such as of magnetic domains separately from the information of surface structure of the specimen. This feature is based on the fact that the tunneling current I flowing between the probe 17 and the specimen 2 varies in dependence on spin orientations and spin polarization ratios P. More specifically, when the spin orientation of the probe 17 is identical with that of the specimen, a tunneling current given by $I=I_0(1+P)$ can be detected, while when the spin orientations mentioned above are opposite to each other, a tunneling current given by $I=I_0(1-P)$ can be detected. In the above expressions, $I_0$ represents a current when $P=0$. In this conjunction, it should be added that spin orientation and spin polarization ratio in the tip end of prove 17 can be controlled by providing an exciting coil 2013 around the cantilever 1 in combination with an exciting current source 2014.

Figure 23A:
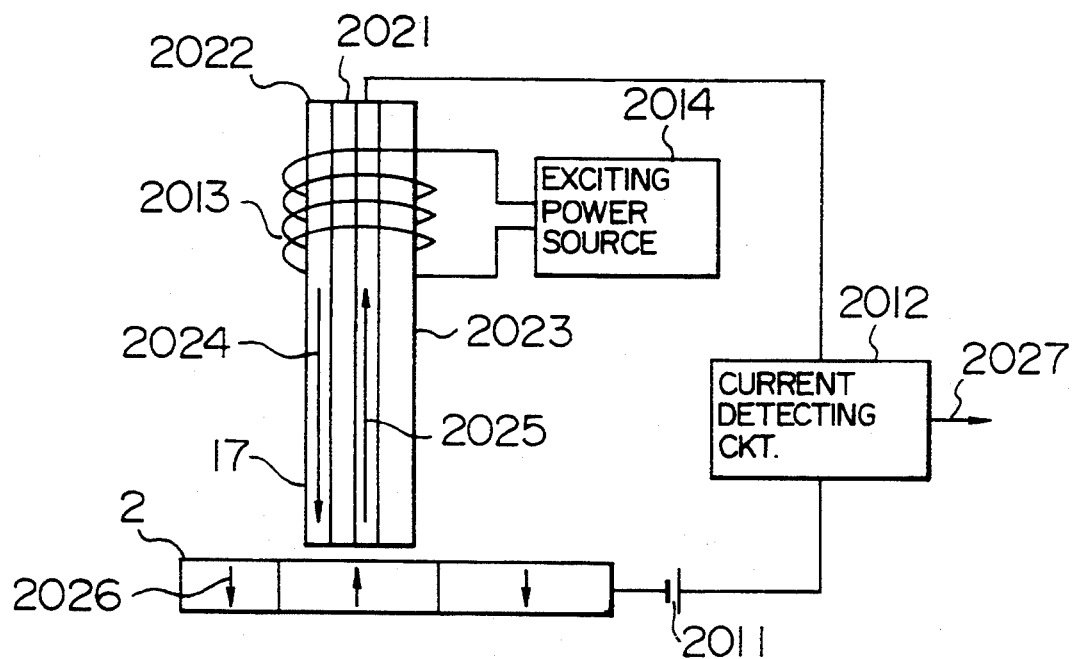
FIGS. 23a and 23b are diagrams for illustrating a measuring principle according to the invention.
Figure 23B:
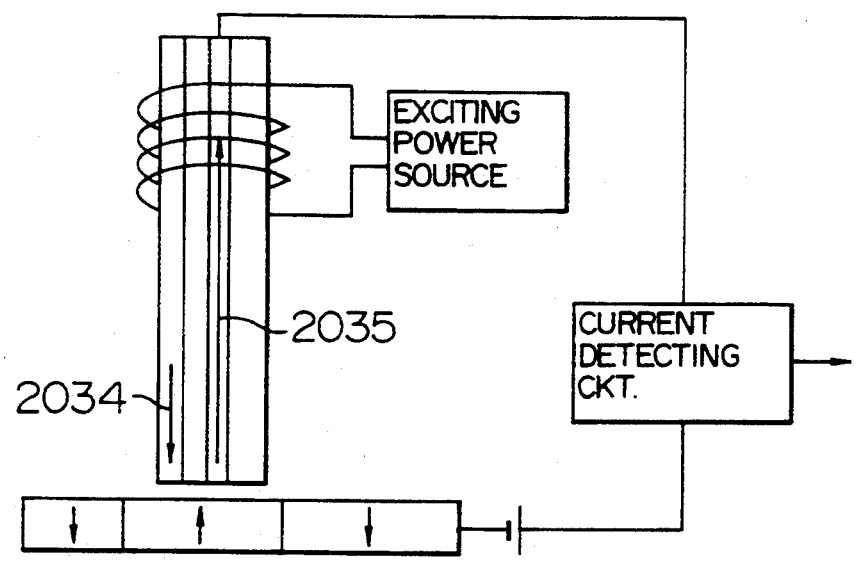

FIGS. 23a and 23b show exemplary structures of the probe 17. Referring to the figure, the probe 17 is constituted by stacking or laminating a magnetic film 2022 of a ferromagnetic material such as Permalloy (Ni—Fe alloy) over a probe substrate 2023 made of Si or $SiO_2$ with a nonmagnetic film 2021 such as copper or the like being interposed between the substrate 2023 and the magnetic film 2022. The laminated film should preferably be formed through an epitaxial process. Further, the magnetic film 2022 may be formed of a magnetic material containing at least one element of Fe, Ni and Co in addition to Permalloy. Similarly, the nonmagnetic film 2021 may be formed of a film containing at least one element of Cr, Pt, Au, Ag, Al and C in addition to Cu. Besides, by alternately stacking nonmagnetic layers of Mn and Al, there can be realized a magnetic probe which is equally useable to the same effect.

In general, spin $P_1$ (designated by 2024) in the overlying magnetic film and spin $P_2$ (2025) in the underlying magnetic film are imparted in anti-parallel with each other, as shown in the figure. However, it goes without saying that same aimed effect can be obtained even when both spines are in a same orientation. Further, it should be added that the polarization ratio of spin $P_1$ (2024) of the upper magnetic film is approximately equal to that of spin $P_2$ (2025) of the lower magnetic film.

Now, it is assumed that spin of the probe 17 is oriented orthogonally to the surface of the specimen 2 while spins 2026 of the specimen are also perpendicularly to the specimen surface with alternating orientations. By applying a tunneling bias between the probe 17 and the specimen 2, a current flowing at that time is detected by a current detecting circuit 2012. When the polarization rate of spin $P_1$ (2024) of the upper magnetic film is equal to that of spin $P_2$ (2025) of the lower magnetic film, i.e., when $P_1=P_2$, as shown in FIG. 23a, the current 2027 flowing between the probe 17 remains constant even when the orientation of spins in the specimen 2026 changes alternately. By disposing an exciting coil 2013 around the probe 17 and exiting the coil 2013 by a DC current supplied from an exciting power supply 2014, it is possible to impart a difference in the polarization ratio or factor between spin $P_1$ (2024) in the upper magnetic film and spin $P_2$ (2025) in the lower magnetic film such that $P_1 \leqq P_2$, as is shown in FIG. 23b. Of course, different polarization such that $P_1 \leqq P_2$ can be realized by reversing the excitation. When the specimen surface is scanned with the probe 17 having a polarization rate given by $P_2-P_1$, a greater value of the current 2027 can be detected in the surface region where the spin orientation thereof is same as that of the probe 17 when compared with the region where the spin orientations mentioned above are opposite to each other.

Thus, in the arrangement in which the probe 17 is installed at a free tip end of the cantilever 1, as shown in FIG. 22, the Z-piezoelectric device of the XYZ-scanner 14 is so controlled that the atomic force acting between the probe 17 and the specimen remains constant, i.e., the distance between the probe 17 and the specimen 2 is constant. In that case, the surface geometry information of the specimen can be obtained from the control signal for the Z-piezoelectric device while magnetic information of the specimen can be derived from changes in the current flow between the probe 17 and the specimen 2 separately from the surface geometry information.

The above description has been made on the assumption that the orientations of spins in the probe 17 and the specimen 2 are both perpendicular to the specimen surface. It will however be understood that similar effects can be attained even in the case where spins are oriented in parallel with the specimen surface. Displacement of the cantilever 1 can equally be detected by adopting a contactless large area displacement detecting method exemplified by a laser interferometer method, a capacitance method, an astigmatic method or a tunneling current detecting method instead of the laser beam deflection method or optical lever method mentioned above.

Finally, it should also se mentioned that the ferromagnetic film constituting a active part of the probe 17 may be implemented in a single-layer ferromagnetic film in place of a laminated layer structure shown in FIGS. 23a and 23b.

Embodiment 13

FIG. 24 is a diagram showing a still further embodiment of the invention. An exciting coil 2013 is energized by an AC current of a specific frequency in a range of several tens of Hz to several mega Hz by means of an oscillator 2015, to thereby change the spin polarization ratio of the probe 17 mounted at a free tip end of the cantilever 1. In that case, a current flowing between the probe 17 and the specimen 2 changes as an alternating current. The excitation frequency of the oscillator 2015 is applied to a lock-in amplifier 2016 as a reference signal, to thereby detect a peak value of the tunneling current having a same frequency component as the excitation frequency. In other respects, the apparatus operates similarly to the preceding embodiment. With the arrangement according to the instant embodiment of the invention, signal/noise ratio of the detection current can be improved.

As is apparent from the foregoing description, according to the teachings of the invention, magnetic domain structure and geometrical surface structure of specimens can be measured simultaneously and separately from each other, which has been impossible with the techniques known heretofore. Thus, with the present invention, it is now possible to perform correlative analyses of specimens for structure and magnetized states thereof.

We claim:

1. A surface observing apparatus for obtaining information of a specimen, comprising:
   a probe disposed in the close vicinity of said specimen;
   a cantilever for holding said probe;
   vibrating means for vibrating said cantilever;
   scanning means for scanning a surface of said specimen with said probe;
   means for detecting a displacement or deflection signal from said cantilever to thereby allow information of said specimen to be derived on the basis of the displacement or deflection of said cantilever;
   measuring means for measuring a changing rate of the force from the AC component of the displacement or deflection of said cantilever which has a frequency corresponding to a frequency of said vibrating means;
   a servo control circuit having an input supplied with the DC component of the displacement or deflection of said cantilever; and
   moving means for controlling a distance between said probe and said specimen in accordance with a control output of said servo control circuit wherein the force acting on said probe is determined on the basis of an output signal of said servo control circuit.

2. A surface observing apparatus according to claim 1, further comprising:
   a lock-in amplifier for separating and detecting the AC component having the same frequency in said cantilever as the vibration frequency of said vibrating means, wherein change in the force acting on said probe is measured on the basis of an output signal of said lock-in amplifier.

3. A surface observing apparatus according to claim 1, wherein a tip end portion of said probe is formed of a magnetic material, said apparatus further comprising:
   means for controlling magnetic state of said magnetic material.

4. A surface observing apparatus according to claim 3, further comprising:
   means for measuring a component of the force acting in the direction perpendicular to the surface of said specimen and a component of the force acting in the direction horizontally to the surface of said specimen by changing direction of magnetization of said probe.

5. A surface observing apparatus according to claim 1, wherein at least a surface of a tip end portion of said probe is formed of an electrically conductive material, said apparatus further comprising:
   means for applying a voltage to said electrically conductive tip end portion of said probe.

6. A surface observing apparatus according to claim 1, further comprising:
   means for three-dimensionally holding said probe at every point for measurement above said specimen; and
   means for arbitrarily setting a distance between said probe and said specimen in the state where said probe is being held;
   wherein said force and a gradient thereof acting on said probe are measured at said arbitrarily set distance.

7. A surface observing apparatus according to claim 1, further comprising:
   means for vibrating said probe in parallel with said surface of said specimen;
   light source means for irradiating said cantilever with a light beam; and
   two-dimensional sensor means for detecting a reflected light beam from said cantilever.

8. A surface observing apparatus according to claim 1, further comprising:
   a probe moving mechanism for moving the cantilever holding said probe on and along a plane extending substantially in parallel to said surface of said specimen,
   wherein said probe is caused to scan the surface of said specimen while being moved by said probe moving mechanism.

9. A surface observing apparatus according to claim 8, wherein said cantilever is disposed on said probe so that said probe is positioned outside of said probe moving mechanism.

10. A surface observing apparatus according to claim 8, further comprising:
    a specimen moving mechanism for two-dimentionally moving said specimen in a plane extending substantially in parallel with said surface of said specimen.

11. A surface observing apparatus according to claim 10, wherein said specimen moving mechanism has a moving range greater than 1 mm inclusive in each of two-dimensional X- and Y-directions.

12. A surface observing apparatus according to claim 1, further comprising:
    means for detecting displacement of said cantilever;
    mean for exciting said cantilever on the basis of the detected displacement;
    reference signal generating means for generating a signal having a constant frequency and a constant phase;
    phase difference detecting means for detecting a phase difference between a phase of an output signal of said reference signal generating means and a phase of an output signal of said cantilever displacement detecting means; and adjusting means for adjusting a distance between said cantilever and the surface of said specimen so that the phase difference between the output signal of said reference signal generating means and the output signal of said cantilever displacement detecting means approaches a phase difference of zero.

13. A surface observing apparatus according to claim 12, further comprising:
means for applying an electrostatic bias between said specimen and said probe.

14. A surface observing apparatus according to claim 1, further comprising:
means for detecting the DC component of displacement of said cantilever;
means for controlling the position of said probe so that the DC component of the displacement of said cantilever is kept constant;
means for detecting a current flowing between said probe and said specimen;
means for implementing said probe in the form of a spin polarized ferromagnetic probe;
means for changing a spin polarization ratio of said ferromagnetic probe; and means for detecting a current having a specific frequency and flowing between said specimen and said probe.

15. A surface observing apparatus according to claim 14, further comprising: means for changing said spin polarization ratio of said ferromagnetic probe with a specific frequency selected.

16. A surface observing apparatus according to claim 1, wherein the DC component is an output from a low-pass filter and has a frequency lower than that of the AC component.

17. A surface microscopy method, comprising the steps of:
scanning a surface of a specimen with a probe in repulsive force mode by relatively moving said probe and said specimen;
selectively stopping movement of said probe or said specimen at every pixel on said surface of said specimen;
moving said probe or said specimen so that a distance between said probe and said surface of said specimen changes;
detecting a force and force gradient between said probe and said surface of said specimen at two different positions thereby measuring a profile of said surface of said specimen and the gradient distribution of forces; and
repeating the above-mentioned steps for each of the pixels for said surface structure of said specimen and said force gradient distributions of said specimen.

18. A surface microscopy method according to claim 17, wherein further a stray magnetic field distribution is measured as said force gradient distribution.

19. A surface microscopy method according to claim 18, wherein further a stray electric field distribution is measured as said force gradient distribution.

20. A surface observing apparatus, comprising:
a probe;
a cantilever carrying said probe;
probe moving means for moving said probe in a plane extending substantially in parallel with the surface of a specimen and in a plane extending substantially perpendicular to the surface of said specimen;
specimen moving means for moving said specimen in a plane extending substantially in parallel to the surface of said specimen so as to effect a scanning of said surface by said probe; and
means for detecting a force gradient between said probe and said surface of said specimen at two different positions and for measuring a profile of said surface of said specimen, wherein a force gradient distribution is detected by positioning said probe at said two different positions in a direction perpendicular to said surface of said specimen.

21. A surface observing apparatus, comprising:
a probe in the form of a spin polarized ferromagnetic needle;
a deformable cantilever for holding said probe;
means for causing said probe to scan a surface of a specimen to be observed along said surface;
means for detecting a DC component of displacement or deflection of said cantilever;
means for controlling a position of said probe or alternatively a position of said specimen so that the DC component of displacement or deflection of said cantilever is maintained constant;
means for detecting a current flowing between said probe and said specimen;
means for changing a spin polarization ratio of said ferromagnetic probe needle with a predetermined frequency; and
means for detecting a current flowing between said specimen and said probe needle and with said predetermined frequency.

22. A surface observing apparatus, comprising:
a probe;
a deformable cantilever holding said probe;
means for scanning a surface of a specimen for observation with said probe along said specimen surface;
means for vibrating said cantilever;
a positive feedback loop, including:
means for detecting displacement or deflection of said cantilever,
a feedback circuit for feeding back a signal corresponding to the frequency of an output of said detecting means to said vibrating means, and
a phased locked loop which includes said positive feedback loop and further includes:
a reference frequency generator for generating a desired frequency,
a phase comparator for detecting a phase difference between the desired frequency and the signal corresponding to the frequency of the output of said detecting means, and
means for adjusting a relative position between said probe and said surface of said specimen so that the frequency of the output of said detecting means is changed;
reference signal generating means for generating a signal of a constant frequency and phase;
means for detecting a phase difference between the output signal of said reference signal generating means and the output signal of said cantilever displacement or deflection detecting means; and
control means for controlling a distance between a tip of said probe and said specimen surface so that the phase difference between the output signal of said reference signal generator and the output signal of said cantilever displacement detecting means approaches a phase difference of zero.

23. A surface observing apparatus according to claim 22, wherein said positive feedback loop includes means for limiting an output amplitude from said detecting means.

24. A surface observing apparatus according to claim 22, wherein the relative position adjusting means controls, when the apparatus starts, a relative position between the probe and surface of said specimen by means of a signal which responds to a difference in phase between the desired frequency and a signal indicating the frequency of the output of said detecting means.

* * * * *